US010596665B2

(12) United States Patent
Brambilla et al.

(10) Patent No.: US 10,596,665 B2
(45) Date of Patent: Mar. 24, 2020

(54) STRIP CLADDING HEADS HAVING INDEPENDENT STRIP PRESSURE ADJUSTMENTS AND STRIP CLADDING SYSTEMS WITH STRIP CLADDING HEADS HAVING INDEPENDENT STRIP PRESSURE ADJUSTMENTS

(71) Applicant: Illinois Tool Works Inc., Glenview, IL (US)

(72) Inventors: Fabrizio Bernardo Brambilla, Merate (IT); Catalin Toma, Barendrecht (NL); Domenico Redaelli, Cisano Bergamasco (IT); Petrus Hermanus Keultjes, Nljmegen (NL)

(73) Assignee: Illinois Tool Works Inc., Glenview, IL (US)

( * ) Notice: Subject to any disclaimer, the term of this patent is extended or adjusted under 35 U.S.C. 154(b) by 354 days.

(21) Appl. No.: 15/392,534

(22) Filed: Dec. 28, 2016

(65) Prior Publication Data
US 2017/0312865 A1     Nov. 2, 2017

(30) Foreign Application Priority Data
Apr. 28, 2016    (IT) ........................ 102016000043627

(51) Int. Cl.
*B23K 37/04*      (2006.01)
*B23K 25/00*      (2006.01)
(Continued)

(52) U.S. Cl.
CPC .......... *B23K 37/0408* (2013.01); *B23K 9/042* (2013.01); *B23K 9/133* (2013.01);
(Continued)

(58) Field of Classification Search
None
See application file for complete search history.

(56) References Cited

U.S. PATENT DOCUMENTS 2,511,976 A   *   6/1950   Frost ...................... B23K 9/186
                                                                   219/73
2,848,593 A   *   8/1958   Newman ................ B23K 9/186
                                                                   219/73
(Continued)

FOREIGN PATENT DOCUMENTS

DE          2364569         6/1975
GB          1332915        10/1973
(Continued)

OTHER PUBLICATIONS

Search Report Appln. No. 10-2016-000043616 dated Feb. 1, 2017 (7 pages).
(Continued)

*Primary Examiner* — Ibrahime A Abraham
*Assistant Examiner* — Gyounghyun Bae
(74) *Attorney, Agent, or Firm* — McAndrews, Held & Malloy, Ltd.

(57) ABSTRACT

Strip cladding heads having independent strip pressure adjustments and strip cladding systems with strip cladding heads having independent strip pressure adjustments are disclosed. A disclosed example cladding head for strip cladding system includes a first contact jaw, a second contact jaw, and a third contact jaw. The first contact jaw includes first and second contacts to deliver welding power to a cladding strip that is driven between the first and second contacts. The second contact jaw includes third and fourth contacts to deliver the welding power to the cladding strip that is driven between the third and fourth contacts. The third contact jaw includes fifth and sixth contacts to deliver the welding power to the cladding strip that is driven between the fifth and sixth contacts, where the first, second, and third contact jaws selectively provide symmetrical contact with the cladding strip across a width of the cladding strip when the cladding strip has one of at least three incremental strip
(Continued)

widths, and the three incremental strip widths correspond to ones of the first, second, and third contact jaws.

18 Claims, 18 Drawing Sheets

(51) Int. Cl.
  *B23K 37/06* (2006.01)
  *B23K 9/04* (2006.01)
  *B23K 9/18* (2006.01)
  *B23K 9/133* (2006.01)
(52) U.S. Cl.
  CPC ............... *B23K 9/18* (2013.01); *B23K 9/186* (2013.01); *B23K 25/005* (2013.01); *B23K 37/06* (2013.01)

(56) References Cited

U.S. PATENT DOCUMENTS

| | | | | |
|---|---|---|---|---|
| 3,271,553 | A * | 9/1966 | Johnson | B23K 9/04 219/73.21 |
| 3,358,115 | A * | 12/1967 | Arnoldy | B23K 9/04 219/73.21 |
| 3,415,975 | A | 12/1968 | Johnson | |
| 3,609,292 | A * | 9/1971 | Arnoldy | B23K 9/186 219/137 R |
| 3,709,420 | A | 1/1973 | Grushon | |
| 3,730,136 | A | 5/1973 | Okada | |
| 3,922,519 | A * | 11/1975 | Miyano | B23K 9/04 219/73.11 |
| 3,954,218 | A | 5/1976 | Van Dijk | |
| 4,005,306 | A * | 1/1977 | Overby | B23K 9/022 219/73.21 |
| 4,020,314 | A * | 4/1977 | Barger | B23K 9/04 219/73 |
| 4,027,135 | A * | 5/1977 | Barger | B23K 9/04 219/76.14 |
| 4,194,667 | A * | 3/1980 | Cook | B23K 20/233 228/4.1 |
| 4,213,558 | A | 7/1980 | Hirobe | |
| 4,414,454 | A | 11/1983 | Zollinger | |
| 4,464,555 | A | 8/1984 | Wallis | |
| 4,632,444 | A * | 12/1986 | Martinez | B25J 13/084 294/104 |
| 4,633,053 | A | 12/1986 | Puthran | |
| 4,647,096 | A | 3/1987 | Lemmer | |
| 4,709,847 | A | 12/1987 | Koller | |
| 4,718,709 | A | 1/1988 | Myers | |
| 5,068,507 | A | 11/1991 | Dick et al. | |
| 5,378,303 | A | 1/1995 | Traise | |
| 5,698,068 | A | 12/1997 | Ichikawa | |
| 5,954,842 | A | 9/1999 | Fogal | |
| 5,957,366 | A | 9/1999 | Friedrich | |
| 6,069,334 | A * | 5/2000 | Capitanescu | B23K 9/04 219/123 |
| 6,082,080 | A * | 7/2000 | Holter | B25J 15/0253 294/67.32 |
| 6,297,472 | B1 | 10/2001 | Bong | |
| 6,491,209 | B1 * | 12/2002 | Cookson | B23K 37/0408 219/101 |
| 6,626,223 | B2 | 9/2003 | Parker | |
| 6,693,254 | B2 | 2/2004 | Menin | |
| 7,132,088 | B2 | 11/2006 | Smid et al. | |
| 7,291,800 | B2 | 11/2007 | Varsell | |
| 8,328,071 | B2 * | 12/2012 | LaValley | B26D 3/16 228/49.3 |
| 8,376,433 | B2 * | 2/2013 | Wegener | B65B 35/36 294/106 |
| 8,552,329 | B2 | 10/2013 | Mate | |
| 8,776,992 | B2 | 7/2014 | Morishita et al. | |
| 8,833,826 | B2 * | 9/2014 | Garcia | B25J 15/0009 294/111 |
| 9,266,181 | B2 | 2/2016 | Flagg | |
| 9,289,843 | B2 | 3/2016 | Golding | |
| 2013/0004674 | A1 | 1/2013 | Golding | |
| 2014/0131323 | A1 | 5/2014 | Flagg | |

FOREIGN PATENT DOCUMENTS

| | | |
|---|---|---|
| KR | 20090011542 | 11/2009 |
| KR | 200449099 | 6/2010 |
| KR | 10-1332393 | * 11/2013 |
| KR | 101332393 | 11/2013 |
| WO | 2016203286 | 12/2016 |

OTHER PUBLICATIONS

Search Report Appln. No. 10-2016-000043665 dated Jan. 25, 2017 (7 pages).
Search Report Appln No. 102016000043657 dated Jan. 25, 2017 (7 pages).
Search Report Appln No. 102016000043661 dated Feb. 1, 2017 (7 pages).
Search Report Appln No. 102016000043627 dated Feb. 1, 2017 (7 pages).
Cladding Capabilities, <http://www.twi-global.com/capabilities/materials-and-corrosion-management/surface-engineering-and-advanced-coatings/cladding> Archived by the Wayback Machine (www.archive.org) on Aug. 13, 2015, (1 page).
ES Bandpasvetshuvud ESQ stripCladding Head, ESW-560, Instruction Manual, 2003 (11 pages).
HC2, Strip Cladding Head, Instruction Manual, ESAB, May 2005 (16 pages).
Int'l Search Report and Written Opinion Appln. No. PCT/US2017/027904 dated Sep. 11, 2017 (12 pages).
Int'l Search Report and Written Opinion for Appln No. PCT/US2017/027908 dated Sep. 14, 2017 (12 pages).
Int'l Search Report and Written Opinion for Appln No. PCT/US2017/027909 dated Sep. 14, 2017 (11 pages).
Int'l Search Report and Written Opinion for Appln No. PCT/US2017/027912 dated Sep. 14, 2017 (12 pages).
Int'l Search Report and Written Opinion for Appln No. PCT/US2017/027916 dated Sep. 14, 2017 (11 pages).
Canadian Office Action Appln No. 3,021,303 dated Jun. 12, 2019 (4 pgs).
Canadian Office Action Appln No. 3,021,834 dated Nov. 8, 2019 (20 pgs).

* cited by examiner

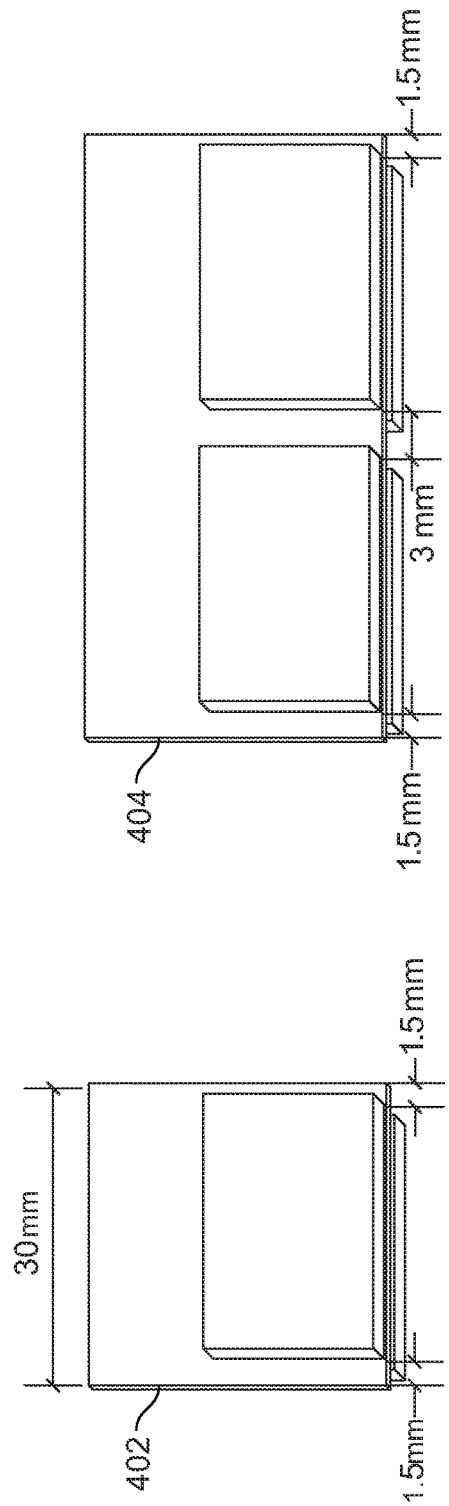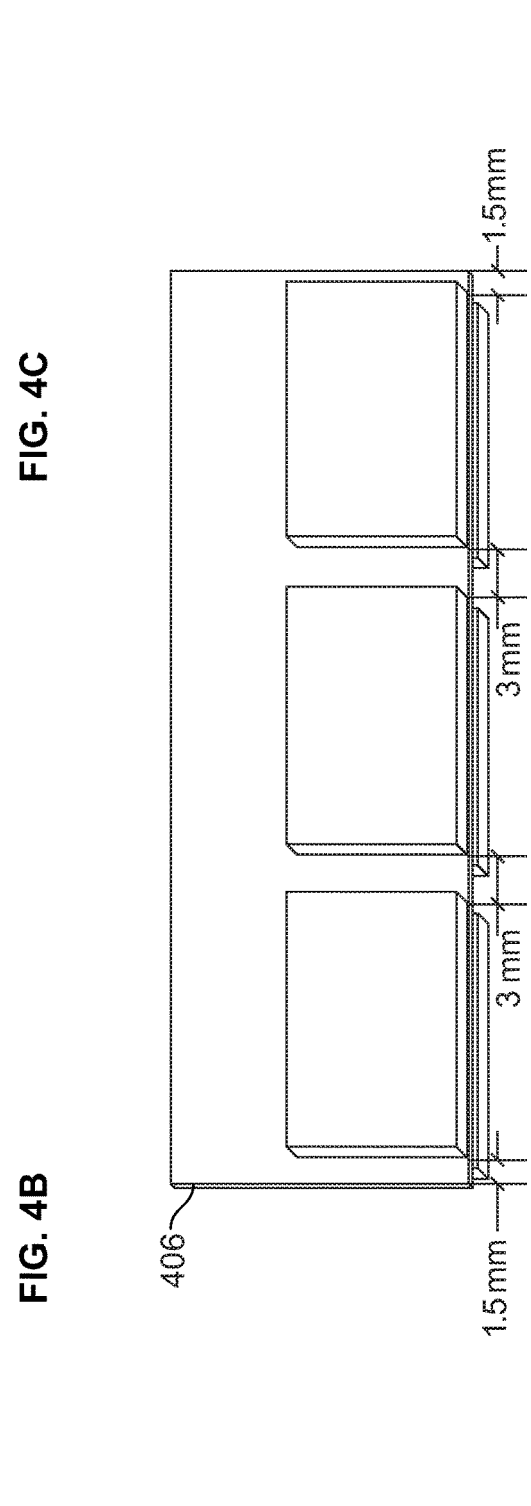

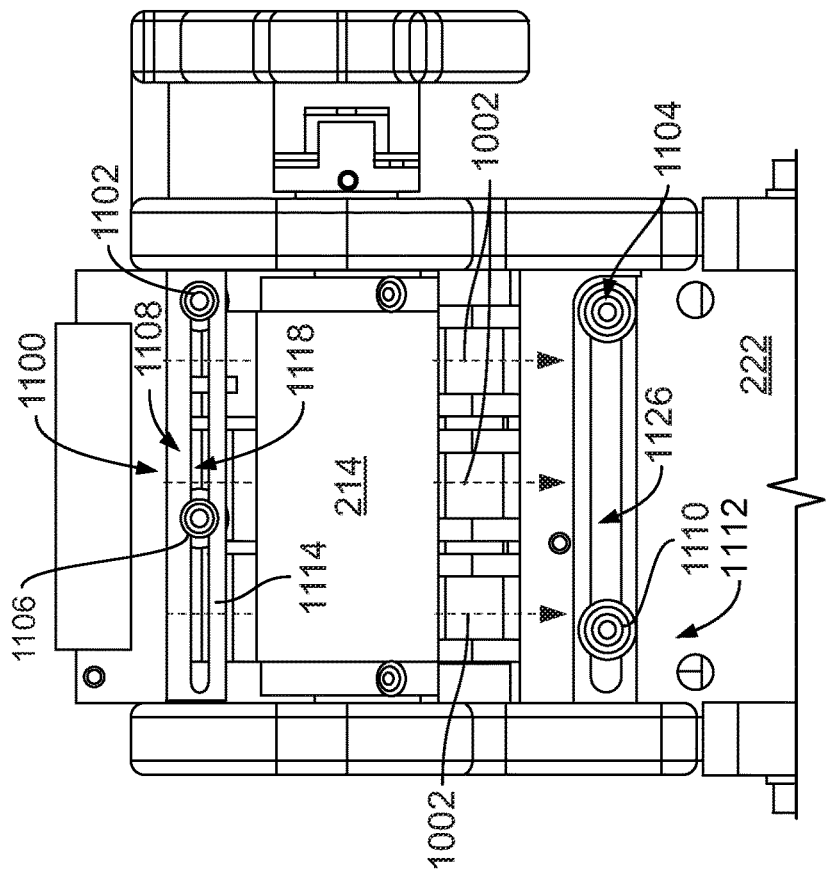
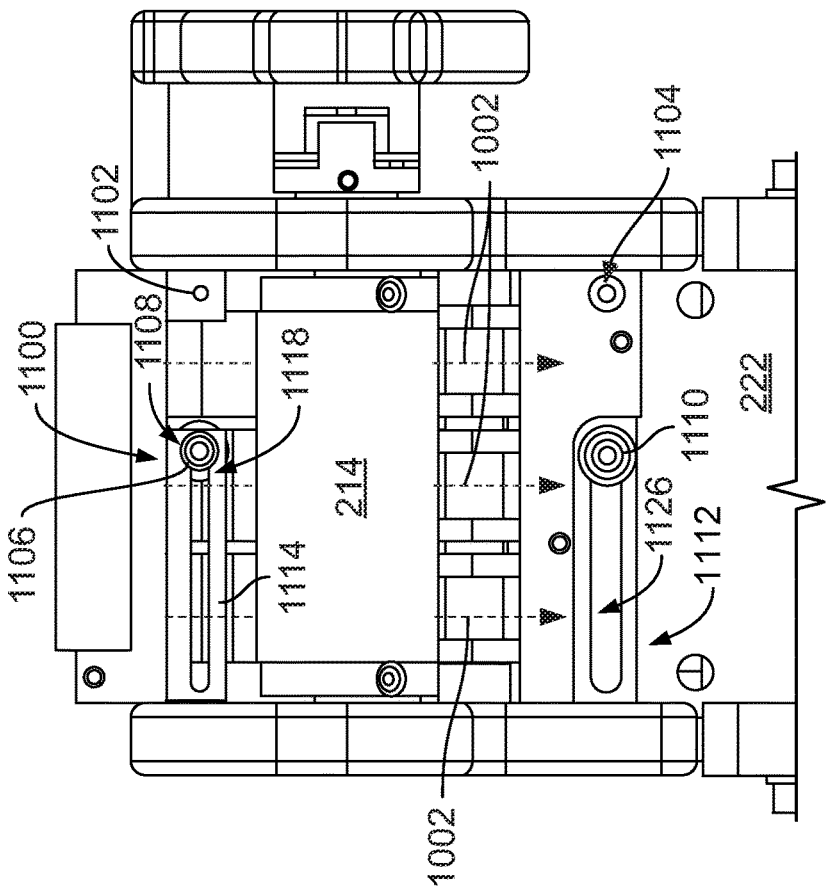

STRIP CLADDING HEADS HAVING INDEPENDENT STRIP PRESSURE ADJUSTMENTS AND STRIP CLADDING SYSTEMS WITH STRIP CLADDING HEADS HAVING INDEPENDENT STRIP PRESSURE ADJUSTMENTS

RELATED APPLICATIONS

This application claims priority to IT Application No. 102016000043627 having an International filing date of Apr. 28, 2016, which is incorporated herein by reference in its entirety.

BACKGROUND

The invention relates generally to welding systems and, more particularly, to strip cladding heads and strip cladding systems.

Cladding is a fundamental process to the manufacturing and fabrication industries and is used across many applications, including petrochemical, oil and gas, pressure vessel and boiler making. The process of cladding involves putting a new layer on top of an existing work piece (e.g., to repair items such as nozzles, ball valves, mill rolls and shafts) and/or to improve the wear resistance or corrosion properties of the piece. Cladding methods include submerged arc strip cladding (SASC) and electroslag strip cladding (ESSC).

In conventional SASC, an arc runs along the width of the strip, depositing weld metal on the base material. Because there is penetration into the base material, dilution levels typically are about 20 percent with SASC.

In conventional ESSC, the strip is fed through a delivery system much like wire is fed during a conventional wire welding process. Since ESSC is not an arc process, heating takes place in the conductive flux, and the resulting heating effect melts the strip and base material into the liquid slag, which is then transferred into molten metal that is deposited onto the base material. The strip rides on top of the slag system created by the flux, protecting the weld.

SUMMARY

Strip cladding heads having independent strip pressure adjustments and strip cladding systems with strip cladding heads having independent strip pressure adjustments are disclosed, substantially as illustrated by and described in connection with at least one of the figures, as set forth more completely in the claims. Disclosed examples include both submerged arc cladding systems and electroslag strip cladding systems.

BRIEF DESCRIPTION OF THE DRAWINGS

FIGS. 4B, 4C, and 4D illustrate example strip electrodes in contact with example combinations of the contact jaws of FIG. 4A, including gaps between adjacent contact jaws and lateral extensions of the strip electrodes beyond the contact jaws, in accordance with aspects of this disclosure.

FIGS. 11A, 11B, and 11C illustrate an example implementation of an adjustable strip guide for the strip feeder of FIGS. 1 and 10, in accordance with aspects of this disclosure.

FIG. 11D illustrates another example implementation of an adjustable strip guide for the strip feeder of FIGS. 1 and 10, in which all of the bearings are adjustable within slots that extend across a width of a strip feed path, in accordance with aspects of this disclosure.

DETAILED DESCRIPTION

Figure 1:
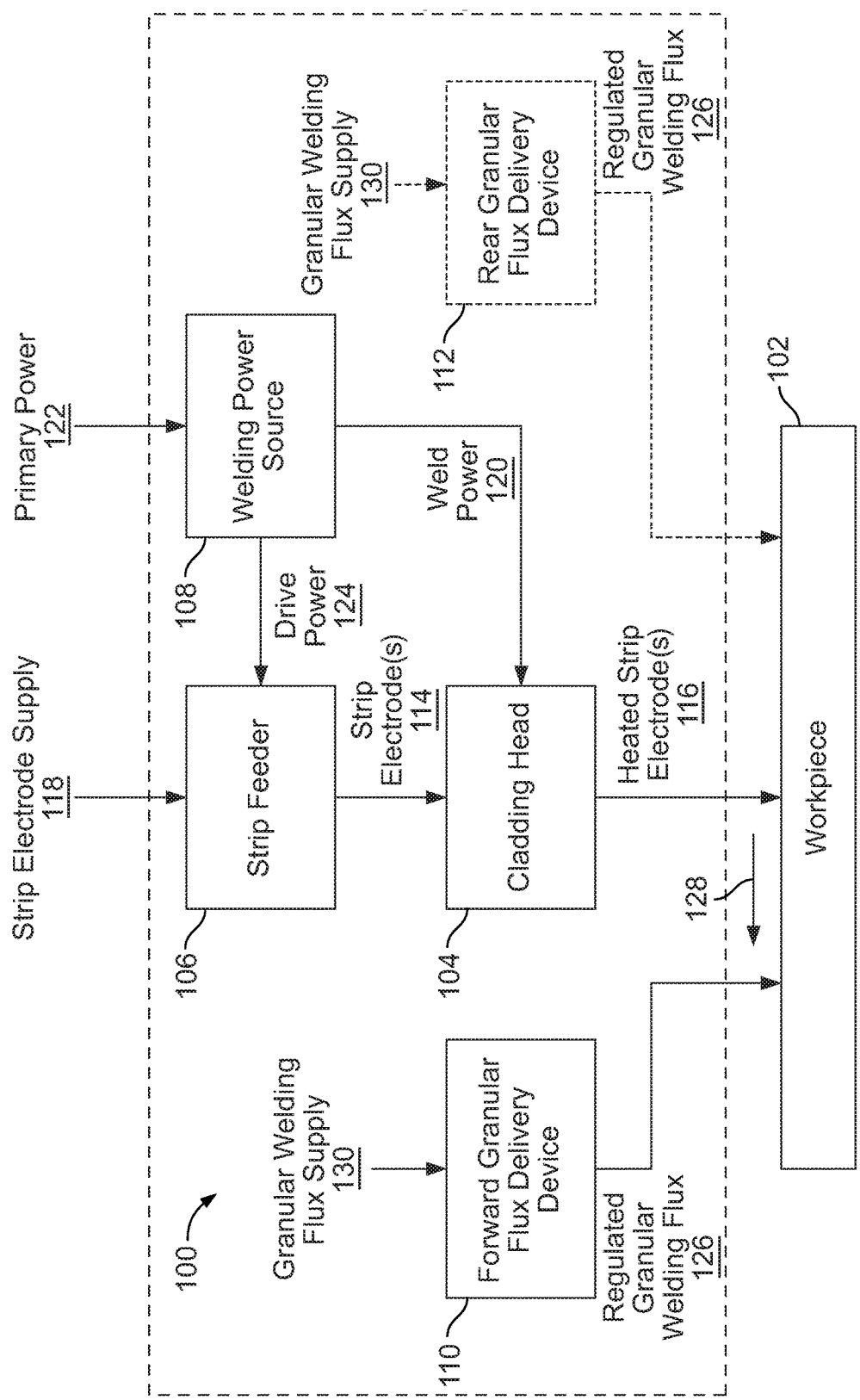
FIG. 1 is a block diagram illustrating an example strip cladding system in accordance with aspects of this disclosure.

Cladding heads are disclosed that may be used for ESSC and/or SASC methods. Disclosed cladding heads have advantages over conventional cladding heads, including enhancing the usability of the cladding heads. For example, compared to conventional cladding heads, disclosed example cladding heads reduce the time and energy required to change the strip widths used by the cladding heads. Where conventional cladding heads may require at least partial deconstruction and/or rebuilding of the cladding head, disclosed examples enable changes of the strip widths by adjusting the position of one or more bearings in a strip feed path. Disclosed examples have improved longevity of components including drive rollers, pressure rollers, and/or electrical contact pads. Additional advantages of disclosed examples are discussed herein.

Disclosed cladding heads for strip cladding systems include a first contact jaw, a second contact jaw, and a third contact jaw. The first contact jaw includes first and second contacts to deliver welding power to a cladding strip that is driven between the first and second contacts. The second contact jaw includes third and fourth contacts to deliver the welding power to the cladding strip that is driven between the third and fourth contacts. The third contact jaw includes fifth and sixth contacts to deliver the welding power to the cladding strip that is driven between the fifth and sixth contacts, where the first, second, and third contact jaws selectively provide symmetrical contact with the cladding strip across a width of the cladding strip when the cladding strip has one of at least three incremental strip widths, and the three incremental strip widths correspond to ones of the first, second, and third contact jaws.

Some example cladding heads further include a first contact pressure adjuster to set a first pressure applied by the first and second contacts to the first cladding strip when the first cladding strip has any of the at least three incremental widths. Some example cladding heads include a second contact pressure adjuster to set a second pressure applied by the third and fourth contacts to the second cladding strip when the second cladding strip has a first one of the at least three incremental widths or a second one of the at least three incremental widths. Some example cladding heads include a third contact pressure adjuster to set a first pressure applied by the fifth and sixth contacts to a third cladding strip when the third cladding strip has the first one of the at least three incremental widths.

In some examples, the second contact pressure adjuster is configured to enable disengagement of the second pressure when the first cladding strip has a third one of the at least three incremental widths, where the third and fourth contacts are out of electrical contact when the second pressure is disengaged via the second contact pressure adjuster. In some examples, the third contact pressure adjuster is configured to enable disengagement of the third pressure when the first or second cladding strip has the second one of the at least three incremental widths or a third one of the at least three incremental widths, the fifth and sixth contacts to be out of electrical contact when the second pressure is disengaged via the second contact pressure adjuster.

In some examples, the at least three incremental widths include 30 millimeters, 60 millimeters, and 90 millimeters. Some examples further include a fourth contact jaw and a fourth contact pressure adjuster. The fourth contact jaw includes seventh and eighth contacts to deliver the welding power to a fourth cladding strip that is driven between the seventh and eighth contacts. The fourth contact pressure adjuster sets a fourth pressure applied by the seventh and eighth contacts to the fourth cladding strip when the fourth cladding strip has a width of 120 millimeters.

Some examples further include a strip guide to feed the first cladding strip through the first contact jaw such that the first cladding strip laterally extends from the first contact jaw by between 0 millimeters and 3 millimeters on a first lateral side and between 0 millimeters and 3 millimeters on a second lateral side. In some examples, the first and second contacts apply the first pressure to a first section of the first cladding strip, the third and fourth contacts apply the second pressure to a second section of the first cladding strip, and the fifth and sixth contacts apply the third pressure to a third section of the first cladding strip.

In some examples, the first and second contacts are separated laterally from the third and fourth contacts by a gap of at least 1 millimeter. In some examples, the first contact pressure adjuster is configured to set the first pressure independently of the pressure or disengagement of the second contact pressure adjuster or the third contact pressure adjuster.

Disclosed example strip cladding systems include a power source to provide welding power and a cladding head configurable to deliver a first cladding strip to a workpiece using the welding power and configurable to deliver a second cladding strip to the workpiece, where the first cladding strip has a first strip width of at least three incremental widths and the second cladding strip has a second width of the at least three incremental widths. The example cladding head includes a first contact jaw, a second contact jaw, and a third contact jaw. The first contact jaw includes first and second contacts to deliver welding power to a cladding strip that is driven between the first and second contacts. The second contact jaw includes third and fourth contacts to deliver the welding power to the cladding strip that is driven between the third and fourth contacts. The third contact jaw includes fifth and sixth contacts to deliver the welding power to the cladding strip that is driven between the fifth and sixth contacts, where the first, second, and third contact jaws selectively provide symmetrical contact with the cladding strip across a width of the cladding strip when the cladding strip has one of at least three incremental strip widths, and the three incremental strip widths correspond to ones of the first, second, and third contact jaws.

Some example strip cladding systems include a first contact pressure adjuster, a second contact pressure adjuster, or a third contact pressure adjuster. The example first contact pressure adjuster sets a first pressure applied by the first and second contacts to the first cladding strip when the first cladding strip has any of the at least three incremental widths. The example second contact pressure adjuster sets a second pressure applied by the third and fourth contacts to the second cladding strip when the second cladding strip has a first one of the at least three incremental widths or a second one of the at least three incremental widths. The example third contact pressure adjuster to set a first pressure applied by the fifth and sixth contacts to a third cladding strip when the third cladding strip has the first one of the at least three incremental widths. In some examples, the second contact pressure adjuster is configured to enable disengagement of the second pressure when the first cladding strip has a third one of the at least three incremental widths. In some examples, the third and fourth contacts are out of electrical contact when the second pressure is disengaged via the second contact pressure adjuster.

In some examples, the third contact pressure adjuster is configured to enable disengagement of the third pressure when the first or second cladding strip has the second one of the at least three incremental widths or a third one of the at least three incremental widths. In some examples, the fifth and sixth contacts are out of electrical contact when the second pressure is disengaged via the second contact pressure adjuster. In some examples, the at least three incremental widths comprise 30 millimeters, 60 millimeters, and 90 millimeters.

Some example strip cladding systems further include a fourth contact jaw comprising seventh and eighth contacts to deliver the welding power to a fourth cladding strip that is driven between the seventh and eighth contacts, and a fourth contact pressure adjuster to set a fourth pressure applied by the seventh and eighth contacts to the fourth cladding strip when the fourth cladding strip has a width of 120 millimeters. Some example strip cladding systems further include a strip guide to feed the first cladding strip through the first contact jaw such that the first cladding strip laterally extends from the first contact jaw by between 0 millimeters and 3 millimeters on a first lateral side and between 0 millimeters and 3 millimeters on a second lateral side.

In some examples, the first and second contacts are to apply the first pressure to a first section of the first cladding strip, where the third and fourth contacts apply the second pressure to a second section of the first cladding strip, and the fifth and sixth contacts apply the third pressure to a third section of the first cladding strip. In some examples, the first and second contacts are separated laterally from the third and fourth contacts by a gap of at least 1 millimeter. In some examples, the first contact pressure adjuster is configured to set the first pressure independently of the pressure or disengagement of the second contact pressure adjuster or the third contact pressure adjuster.

FIG. 1 is a block diagram illustrating an example strip cladding system 100. The example strip cladding system 100 of FIG. 1 may be used to implement SASC and/or ESSC strip cladding processes on a workpiece 102. The example strip cladding system 100 is capable of applying strips having different widths within a range of widths. As described in more detail below, the example strip cladding system 100 of FIG. 1 includes features that reduce potential downtime of the strip cladding system 100 by, for example, reducing strip locking, reducing the time and effort required to change between strips of different widths, reducing wear on components in the strip feeding and/or strip delivery path(s), and/or reducing strain placed on a drive system, compared to conventional strip cladding systems and/or strip cladding heads.

The example strip cladding system 100 of FIG. 1 includes a cladding head 104, a strip feeder 106, a welding power source 108, and a forward granular flux delivery device 110. In some examples, such as performing SASC processes, the example strip cladding system 100 is further provided with a rear granular flux delivery device 112.

The example cladding head 104 receives strip electrodes 114 from the strip feeder 106, heats the strip electrode(s) 114, and delivers heated strip electrodes 116 to the workpiece 102. The example cladding head 104 may be configured to heat and deliver strip electrodes 114 having different widths and/or thicknesses. In some examples disclosed herein, the cladding head 104 is adapted to use strip electrodes 114 of different widths by, for example, increasing a number of contact jaws used to heat the strip electrodes 114 as the width of the strip electrode is increased. Conversely, in some examples one or more of the contact jaws are disengaged (e.g., do not make contact) when the width of the strip electrode does not require use of the one or more contact jaws.

The example strip feeder 106 receives the strip electrodes 114 from a strip electrode supply 118 (e.g., a roll or stack, manual feeding of strip electrodes 114, etc.). In some examples, the strip feeder 106 drives the strip electrodes 114 through the cladding head 104 while maintaining an alignment of the strip electrodes 114. Like the cladding head 104, the example strip feeder 106 of FIG. 1 is configurable to feed strip electrodes 114 having different widths and/or thicknesses.

The cladding head 104 receives weld power 120 from the welding power source 108. The welding power source 108 converts primary power 122 to the weld power 120 for use by the cladding head 104 in resistive heating and/or arc welding the strip electrodes 114 to the workpiece 102. The example welding power source 108 also provides drive power 124 to the strip feeder 106 to enable the strip feeder 106 to drive the strip electrodes 114 through the cladding head 104.

The example forward granular flux delivery device 110 and the example rear granular flux delivery device 112 deliver granular welding flux 126 to the workpiece 102 proximate to the heated strip electrode(s) 116. The forward granular flux delivery device 110 delivers the granular welding flux 126 ahead of the heated strip electrode(s), while the rear granular flux delivery device 112 delivers the granular welding flux 126 behind the heated strip electrodes 116 in a direction of travel 128 of the cladding head 104. The forward granular flux delivery device 110 and the example rear granular flux delivery device 112 receive the granular welding flux 126 from a granular welding flux supply 130.

Figure 2:
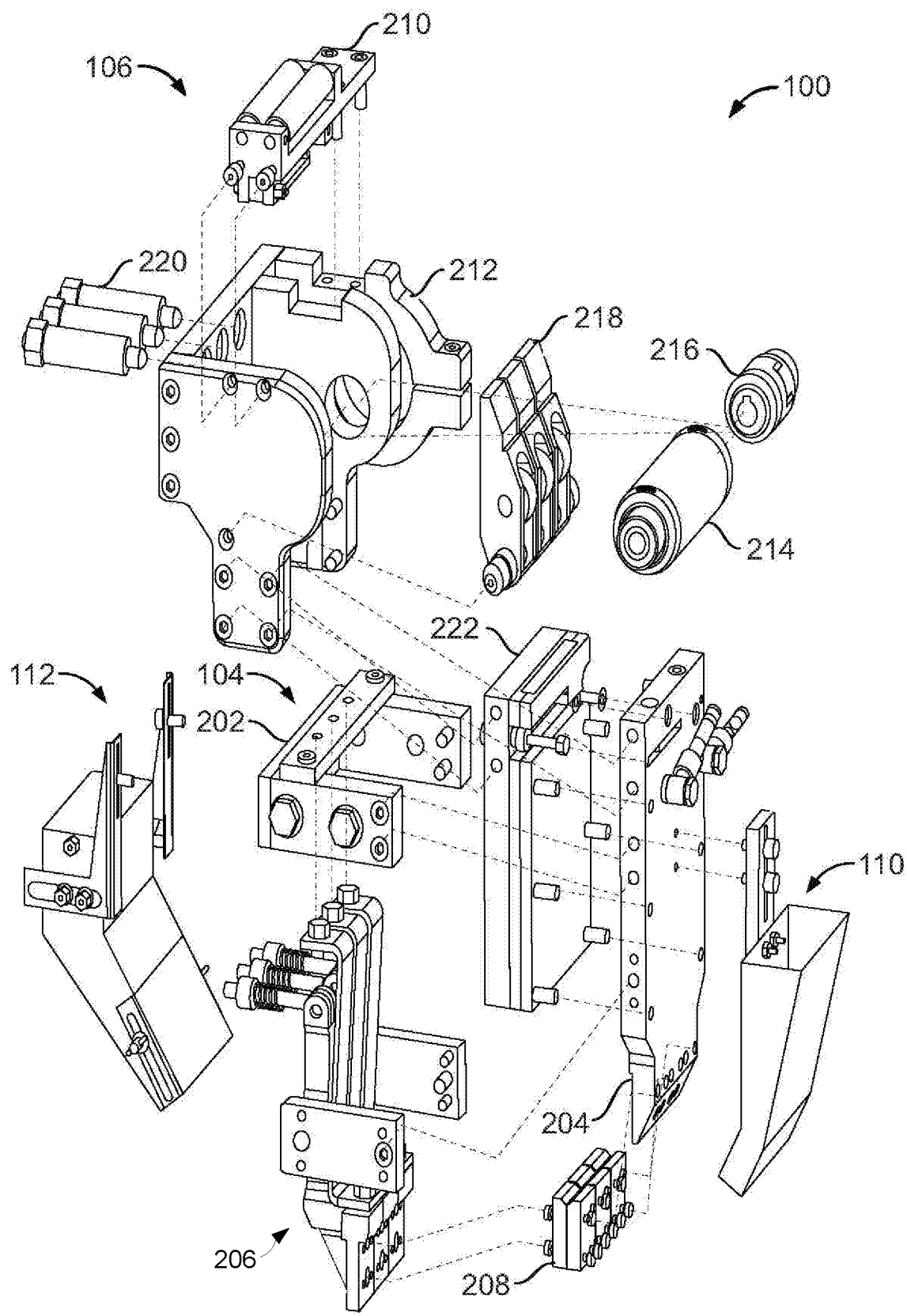
FIG. 2 is a partially exploded view of an example implementation of the strip cladding system of FIG. 1 in accordance with aspects of this disclosure.

FIG. 2 is a partially exploded view of an example implementation of the strip cladding system 100 of FIG. 1. As illustrated in FIG. 2, the strip cladding system 100 includes example implementations of the cladding head 104, the strip feeder 106, the forward granular flux delivery device 110, and the rear granular flux delivery device 112. As described in more detail below, some components illustrated in FIG. 2 are included in both the cladding head 104 and the strip feeder 106. The implementation of FIG. 2 includes three independently adjustable pressure rollers and three independently adjustable contact jaws, and may be used to apply strip electrodes having widths between 30 millimeters and 90 millimeters (e.g., in 30 mm increments). In other examples, more or fewer pressure rollers and/or contact jaws may be used to change the widths of the strip electrodes usable with the strip cladding system 100. As used herein, "independently adjustable pressure" refers to the adjustment of the pressure applied by one element not substantially impacting a pressure applied by a second element. Additionally or alternatively, the widths increments may be greater or less than the example 30 mm width increments of FIG. 2. While an example implementation is illustrated in FIG. 2, one or more of the components shown in FIG. 2 may be combined, divided, re-arranged, and/or otherwise modified.

The cladding head 104 of FIG. 2 includes a cladding head pressure support 202, a static cladding head clamping plate 204, an adjustable cladding head clamping plate 206, and contact plates 208. Collectively, the cladding head pressure support 202, the static cladding head clamping plate 204, the adjustable cladding head clamping plate 206, and the contact plates 208 operate as contact jaws to apply welding-type power to strip electrodes that are fed through the cladding head 104 by the strip feeder 106.

The strip feeder 106 of FIG. 2 includes an upper strip guide 210, a feeder support 212, a drive roller 214, a drive roller clutch 216, pressure rollers 218, pressure adjusters 220, and a lower strip guide 222. Strip electrodes are fed through the upper strip guide 210 to the drive roller 214. The pressure rollers 218 are adjustable via the pressure adjusters 220 to provide a suitable pressure against the drive roller 214 to drive the strip electrodes through the cladding head 104 to the workpiece 102 (e.g., without suffering from slipping of the drive roller). The example upper strip guide 210 and the example lower strip guide 222 are adjustable based on the width of the strip electrode, to keep a consistent alignment of the strip electrode through the strip feeder 106 and the cladding head 104.

Figure 3:
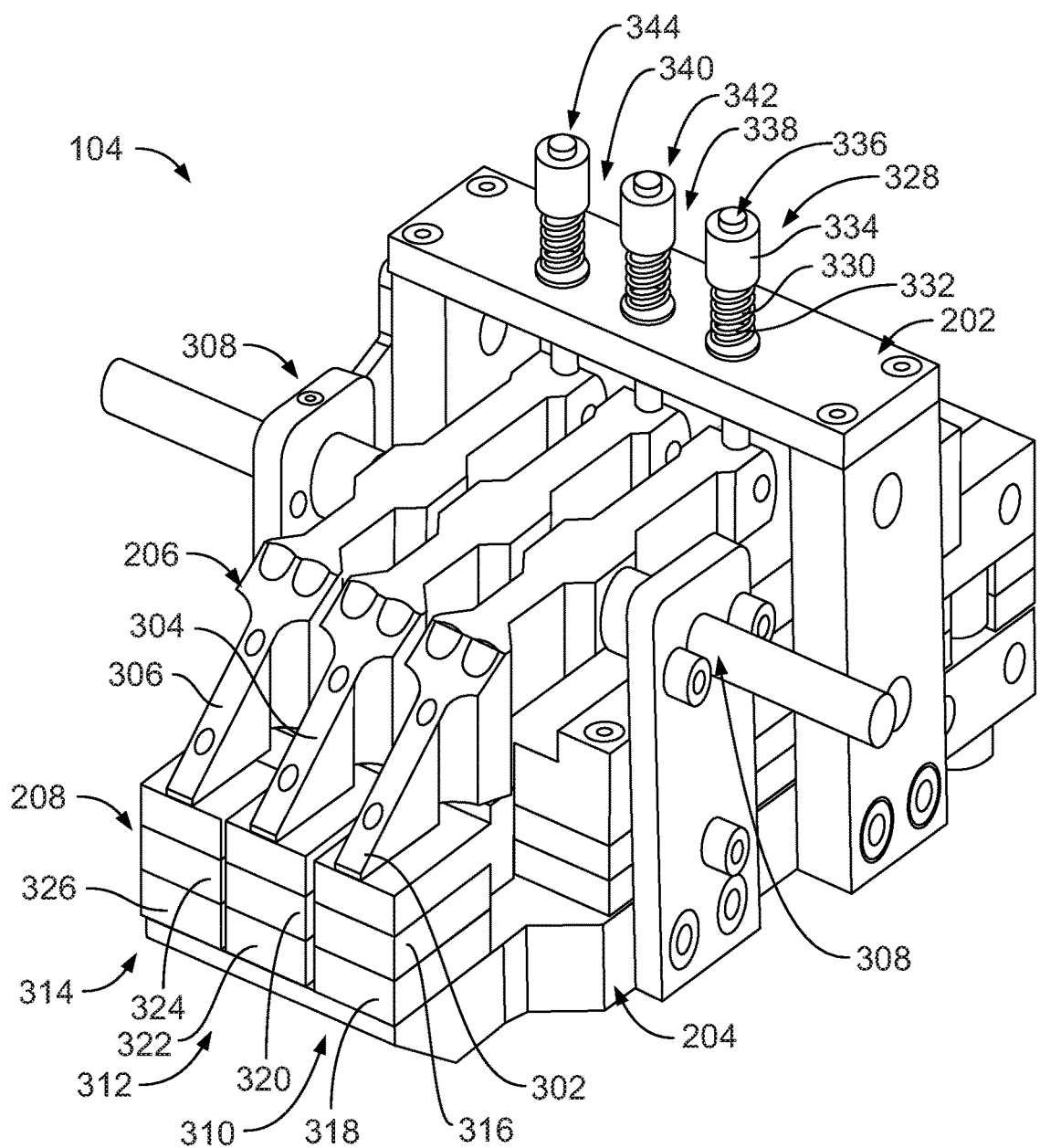
FIG. 3 is a perspective view of an example implementation of the cladding head of FIG. 1, in accordance with aspects of this disclosure.

FIG. 3 is a perspective view of an example implementation of the cladding head 104 of FIG. 1. The example view illustrated in FIG. 3 includes the cladding head pressure support 202, the static cladding head clamping plate 204, the adjustable cladding head clamping plate 206, and the contact plates 208 in an assembled state.

As shown in FIG. 3, the adjustable cladding head clamping plate 206 includes three fingers 302, 304, 306 connected to a pivot 308. The fingers 302, 304, 306 and the static cladding head clamping plate 204 function as contact jaws 310, 312, 314 having the contact plates 208 as electrical contacts. The contact jaws 310, 312, 314 make electrical contact with the strip electrodes. The example fingers 302, 304, 306 are levered arms having the pivot 308 as a fulcrum.

For the contact jaw 310, a first contact plate 316 is attached to the finger 302, and a second contact plate 318 is attached to the static cladding head clamping plate 204 opposite the first contact plate 316. The contact jaws 312, 314 are similar to the contact jaw 310, and include corresponding contact plates 320, 322, 324, 326. For the contact jaw 312, the first contact plate 320 is attached to the finger 304, and a second contact plate 322 is attached to the static cladding head clamping plate 204 opposite the first contact plate 320. For the contact jaw 314, the first contact plate 324 is attached to the finger 306, and a second contact plate 326 is attached to the static cladding head clamping plate 204 opposite the first contact plate 324. The contact plates 316, 318, the contact plates 320, 322, and/or the contact plates 324, 326 provide welding power (e.g., from the welding power source 108 of FIG. 1) to the cladding strip(s) that are driven between the first and second contact plates 316, 318. In some examples, the contact plates 316-326 are constructed with a hard-wearing copper.

The first finger 302 of the cladding head 104 is coupled to a first contact pressure adjuster 328. The first contact pressure adjuster 328 is configured to set a first pressure applied to the cladding strip by the first and second contacts 316, 318 of the first contact jaw 310. In the example implementation of FIG. 3, the contact pressure adjuster 328 applies a force to the finger 302 via the cladding head pressure support 202, which is mechanically coupled (e.g., rigidly coupled) to the pivot 308 and enables the first contact pressure adjuster 328 to apply the force. In the example of FIG. 3, the contact pressure adjuster 328 includes a spring 330 that biases a piston 332 connected to the finger 302. The force applied by the spring 330, via the piston 332, the finger 302, and the pivot 308, forces the first contact 316 of the contact jaw 310 toward the second contact 318. The contact pressure adjuster 328 also includes a spring compressor 334 that applies an adjustable compressive force to the spring 330 to set the bias or force. For example, the spring compressor 334 may be a threaded cap on the piston 332, which may be tightened to increase the compressive force on the spring 330 and, as a result, increase the opposing force applied by the spring to the piston 332 via the spring compressor 334.

The example piston 332 includes one or more visual indicators 346 of the pressure or compressive force applied by the spring compressor 334. An example visual indicator 316 includes markings on the piston 332 that correspond to different pressures. The visual indicators 346 enable an operator of the spring compressor 334 to obtain a consistent pressure across multiple contact pressure adjusters 328 by, for example, setting the spring compressors 334 for each of the multiple contact pressure adjusters 328 using the visual indicators 346 to identify the desired pressure settings (e.g., setting the same pressure setting on each contact pressure adjuster 328 using the same visual indicator 346).

A strip lock preventer 336 limits the pressure applied by the first and second contacts 316, 318 to the cladding strip(s) to be less than a threshold pressure that could cause the cladding strip(s) to be locked in place between the first and second contacts 316, 318. In some examples, the threshold pressure is greater than a pressure needed to make reliable electrical contact between the first and second contacts 316, 318 and the cladding strip. The pressure applied by the contacts reduces or eliminates electrical arcing between the first and second contacts 316, 318 and the cladding strip. In the example of FIG. 3, the strip lock preventer 336 limits the pressure applied to the finger 302 by the spring 330. For example, the strip lock preventer 336 may include a pin through the piston 332 and/or a rigid cap on the spring compressor 334, which limits the extent to which the spring compressor 334 can be threaded onto the threaded piston 332 and, thus, the amount of compression the spring compressor 334 applies to the spring 330.

Similarly, a contact pressure adjuster 338 applies sets a pressure applied to the strip electrode by the contact jaw 312 and a contact pressure adjuster 340 applies sets a pressure applied to the strip electrode by the contact jaw 314. A strip lock preventer 342 limits the pressure applied by the contact jaw 312, and a strip lock preventer 344 limits the pressure applied by the contact jaw 314.

While higher compressive forces are desirable to reduce electrical contact bouncing and reduction in cladding quality, strip locking causes substantial disruption to an ongoing strip cladding process and, in some instances, damage to the strip cladding system 100. As used herein, strip locking occurs when the contact jaw(s) 310, 312, 314 lock the electrode strip in place by friction due to sufficiently high compression on the electrode strip by the contact jaw(s) 310-314. When strip locking occurs in conventional strip cladding devices, the strip electrode is locked into position at the contact jaw(s), but the strip feeder continues to feed the strip electrode(s) toward the contact jaw(s). As a result, the strip electrode may be deformed to relieve the compressive force on the strip electrode applied by the drive roller (e.g., the drive roller 214 of FIG. 2), the drive roller may begin slipping against the strip electrode (e.g., causing premature wear and/or catastrophic damage to the drive roller), and/or other mechanical effects (e.g., component breakage) may result to relieve the mechanical stress applied to the system 100.

The strip lock preventer 336 prevents the spring compressor 334 from exceeding an upper limit on the compressive force of the contact plates 316, 318. The upper limit of the compressive force is set to prevent locking of the electrode strip by the contact jaw 310 (alone or in combination with the other contact jaws 312, 314). Similarly, the spring lock preventers 342, 344 limit the force applied by the contact jaws 312, 314 to the strip electrodes. The ranges of pressures that can be applied by the contact pressure adjusters 328, 338, 340 may be configured based on the contact plate material(s), the strip electrode material(s), the drive force applied to the strip electrode by the drive roller, the drive roller material(s), and/or the strip electrode rigidity.

Figure 4A:
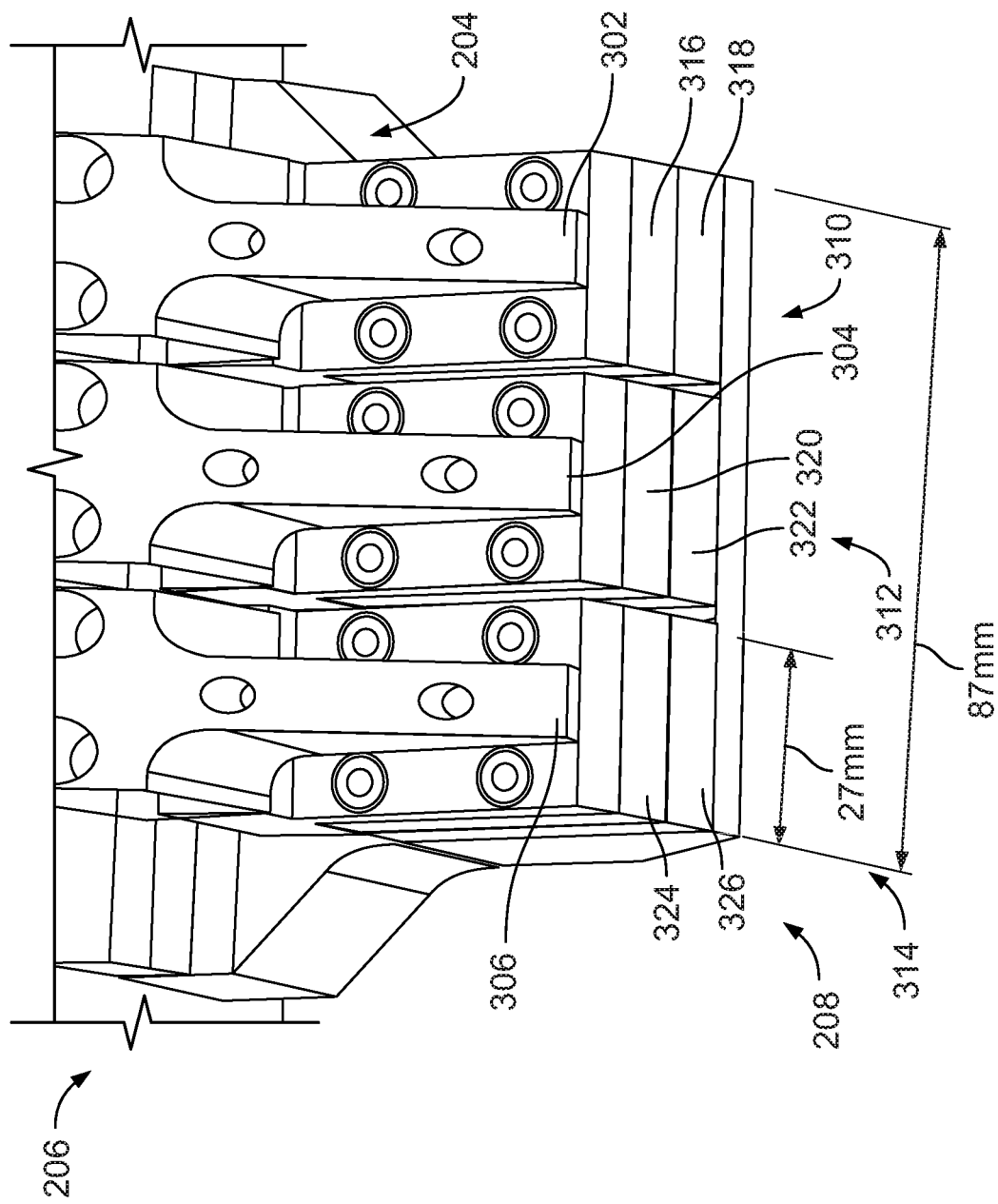
FIG. 4A is another view of the example cladding head of FIG. 3, illustrating an example spacing between the contact jaws, in accordance with aspects of this disclosure.

FIG. 4A is another view of the example cladding head 104 of FIG. 3, illustrating an example spacing between the contact jaws 310, 312, 314. The example contact jaws 310, 312, 314 are configured to apply welding power across a width of an electrode as the electrode passes between the contact plates 316-326 of the contact jaws 310, 312, 314. That is, different ones of the contact jaws 310-314 apply the pressure and the welding power to different sections of the strip electrode. One or more of the contact jaws 310, 312, 314 are used to apply the welding power based on a width of the strip electrode. For example, any of the contact jaws 310, 312, or 314 may be used alone for a narrow strip electrode. A pair of the contact jaws 310 and 312 (or 312 and 314) may be used for a strip electrode that has a width that is wider than the width of any one of the contact jaws 310, 312, 314. All of the contact jaws 310, 312, and 314 may be used for a strip electrode having a maximum width permitted by the system 100.

In the example of FIG. 4A, the total width of the contact jaws 310, 312, 314 used for a given strip electrode width is less than the strip electrode width. In other words, the strip electrode extends laterally beyond the outer edges of the contact jaws 310, 312, 314 that are used to provide the welding power. Each of the contact jaws 310, 312, 314 has a width of less than 29 mm and, in some examples, each of the contact jaws 310, 312, 314 has a width of 27 mm.

Additionally or alternatively, adjacent contact jaws 310 and 312 or 312 and 314 are spaced apart laterally by more than a nominal distance. For example, adjacent contact jaws 310 and 312 or 312 and 314 are spaced at least 1 mm apart and, in some examples, adjacent contact jaws are spaced 3 mm apart. As shown in FIG. 4A, each of the contact jaws has a width of 27 mm, and is separated from adjacent contact jaws by 3 mm. When a standard 30 mm wide strip electrode 402 is applied using the example cladding head 104, only the contact jaw 310 is used to apply the welding power, and the strip electrode 402 laterally extends over the contact jaw 310 by 1.5 mm on each side of the strip electrode 402 (FIG. 4B). When a standard 60 mm wide strip electrode 404 is applied using the example cladding head 104, only the contact jaws 310 and 312 are used to apply the welding power, and the strip electrode 404 laterally extends over the contact jaw 310 by 1.5 mm on one side of the strip electrode and laterally extends over the side of the contact jaw 312 by 1.5 mm on the other side of the strip electrode 404 (FIG. 4C). When a standard 90 mm wide strip electrode 406 is applied using the example cladding head 104, the contact jaws 310, 312, and 314 are used to apply the welding power, and the strip electrode 406 laterally extends over the contact jaw 310 by 1.5 mm on one side of the strip electrode 460 and laterally extends over the side of the contact jaw 314 by 1.5 mm on the other side of the strip electrode 406 (FIG. 4D).

The pressures applied by the contact jaws 310, 312, 314 are independently adjustable via the respective contact pressure adjusters 328, 338, 340. As a result, the appropriate pressures can be applied consistently across the strip electrode, which provides a more reliable application of weld current to the strip electrode relative to using a single pressure across the strip electrode (e.g., by reducing or eliminating mechanical bouncing between the strip electrode and the contacts 316-326) and/or applying the pressure regardless of the strip electrode width. In some examples, the pressure adjusters 328, 338, 340 substantially prevent or substantially eliminate mechanical bouncing. As used herein, substantial prevention and/or substantial elimination (e.g., substantial prevention of bouncing) refers to prevention or elimination (e.g., substantial prevention of bouncing) under rated operation conditions (e.g., in the absence of shock and/or vibration at the cladding head 104 that exceeds rated levels). Additionally, the contact jaws 310, 312, and/or 314 can be disengaged when not being used to apply the weld power to the electrode. For example, if a 60 mm electrode or a 30 mm electrode are used in the example system 100, the pressure applied by the contact jaw 312 is relieved by the contact pressure adjuster 340 to improve the operating life of the corresponding contact plates 324, 326.

By using contact jaws 310, 312, 314 that have widths less than the strip electrode width, the contact plates 316-326 are prevented from coming into direct contact during operation, which reduces wear on the contact plates 316-326. A strip guide may be used to feed the cladding strip through the contact jaw(s) 310, 312, 314 such that the cladding strip laterally extends from the contact jaw(s) by between 0 millimeters and 3 millimeters on a first lateral side and between 0 millimeters and 3 millimeters on a second lateral side. However, other distances may be used provided that the portions of the cladding strip that are not in contact with any of the contact plates 316-326 are adequately heated for the cladding process.

Figure 5:
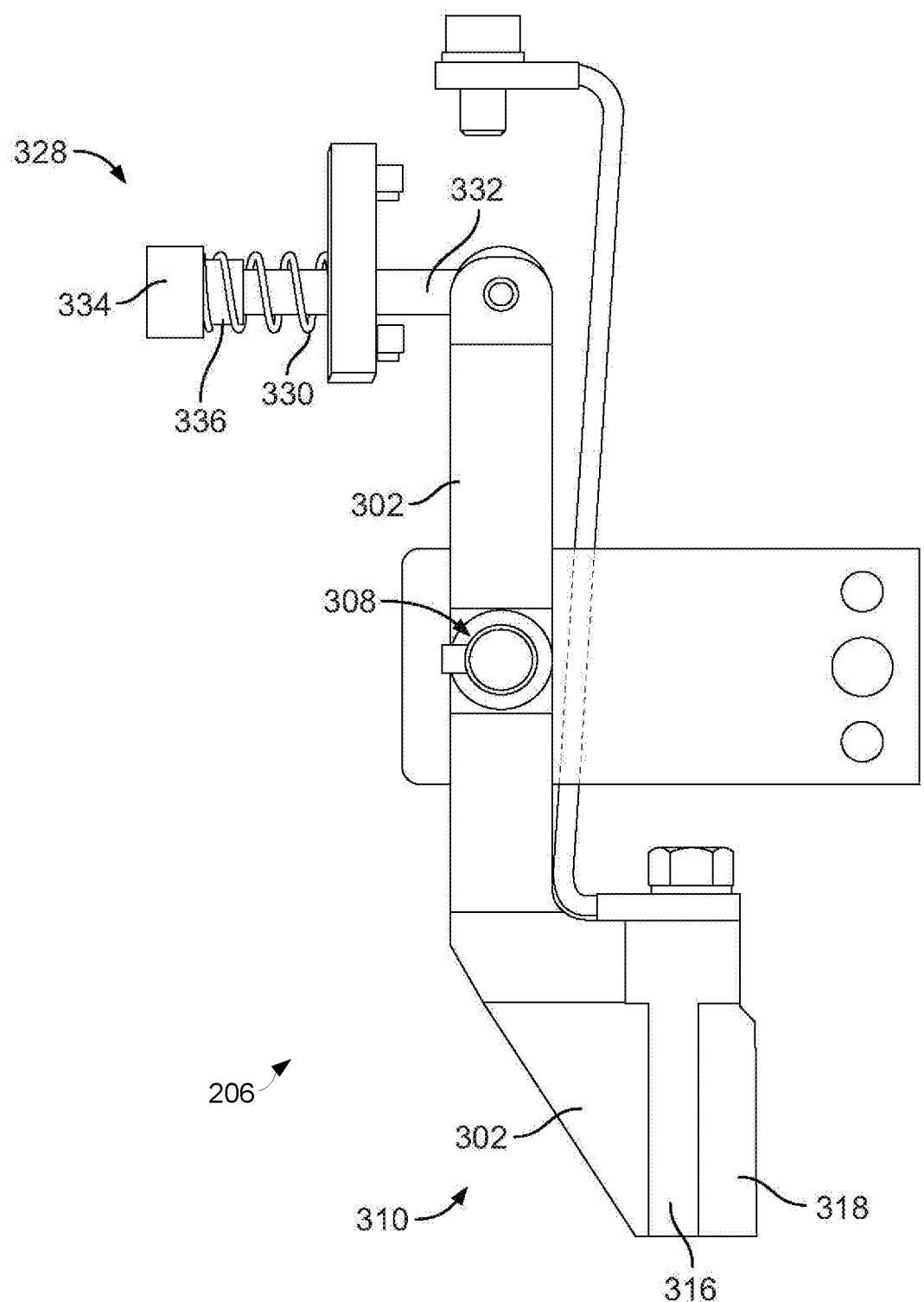
FIG. 5 is another view of the example adjustable head clamping plate of FIG. 3, illustrating an example implementation of a contact jaw, the contact pressure adjuster 328 for the contact jaw, and the strip lock preventer for the contact jaw, in accordance with aspects of this disclosure.
Figure 6:
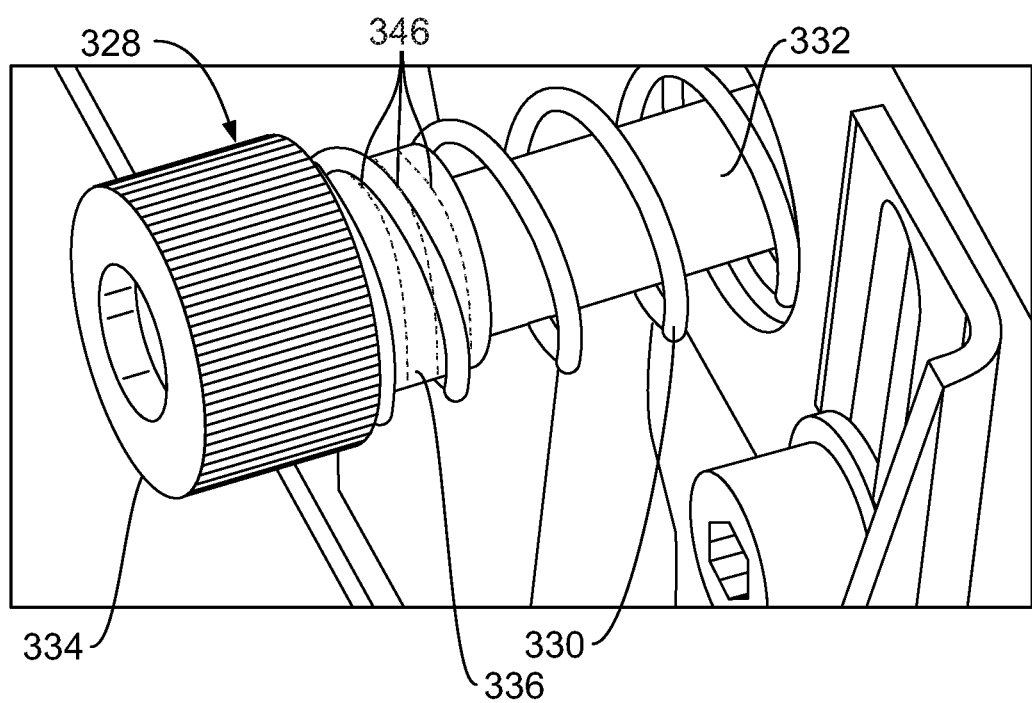
FIG. 6 illustrates another view of the contact pressure adjuster and the strip lock preventer of FIGS. 3 and 5, in accordance with aspects of this disclosure.

FIG. 5 is another view of the example adjustable cladding head clamping plate 206 of FIG. 3, illustrating an example implementation of a contact jaw 310, the contact pressure adjuster 328 for the contact jaw 310, and the strip lock preventer 336 for the contact jaw 310. FIG. 6 illustrates another view of the contact pressure adjuster 328 and the strip lock preventer 336 of FIGS. 3 and 5. As illustrated in FIG. 5, the strip lock preventer 336 may be implemented by providing a portion of the piston 332 with a larger diameter. The portion of the piston 332 implementing the strip lock preventer 336 corresponds to a maximum desired compression of the spring 330 against a support structure 502 when the spring compressor 334 has been tightened until an inner surface of the spring compressor 334 abuts the strip lock preventer 336.

As the pressure is increased via the spring compressor 334, the spring 330 applies greater force to push the spring compressor 334 and, thus, the piston 332, in a direction 504 away from the support structure 502. The piston 332 is connected to the finger 302, and the pivot 308 reverses the force on the piston 332 in the direction 504 to a force on the contact plate 316 in a direction 506 toward the contact plate 508 (e.g., to close the contact jaw 310 and make consistent electrical contact between the contact plates 316, 318).

Figure 7:
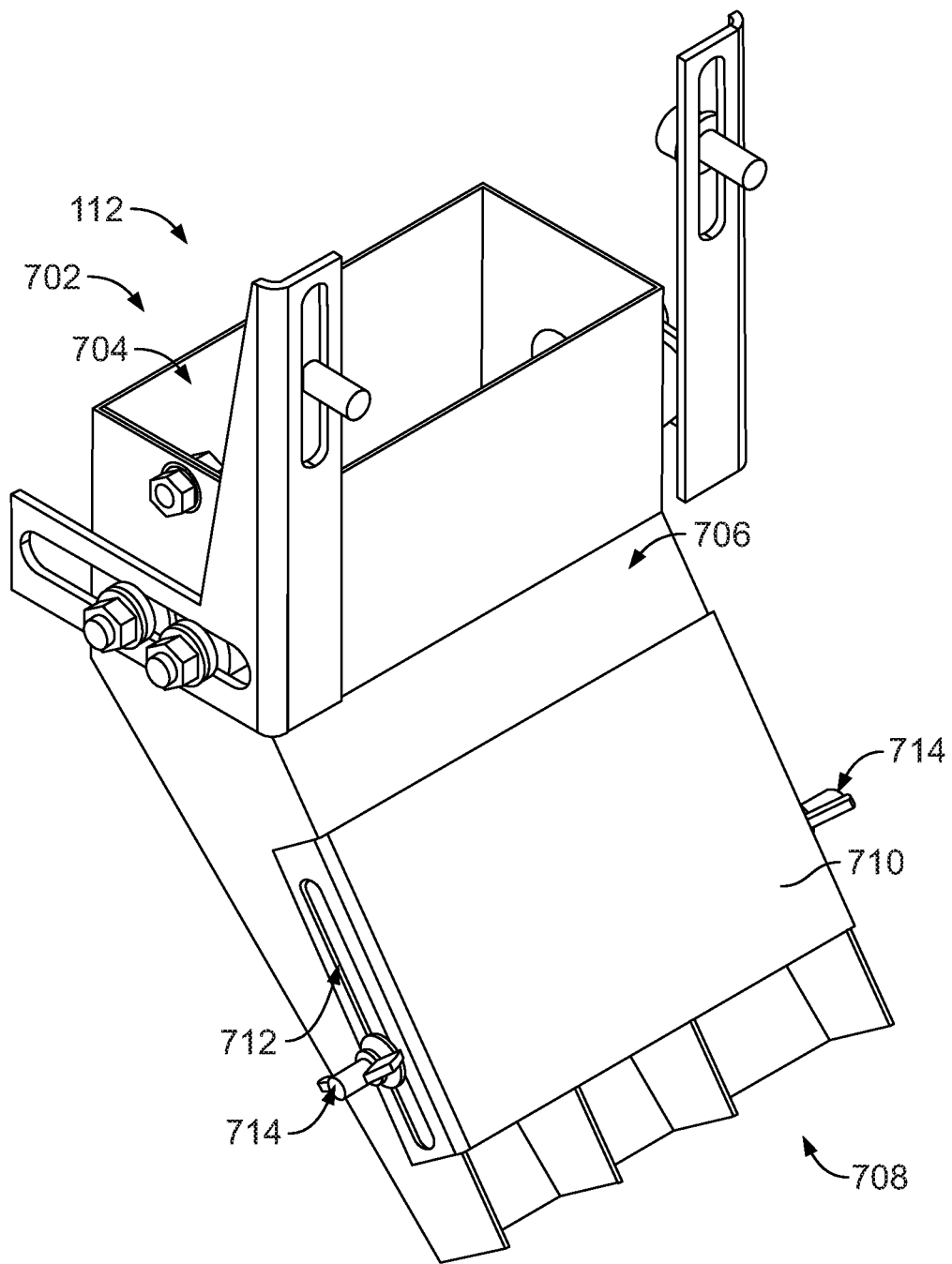
FIG. 7 is a perspective view of an example implementation of the rear granular flux delivery device of FIG. 1, in accordance with aspects of this disclosure.

FIG. 7 is a perspective view of an example implementation of the rear granular flux delivery device 112 of FIG. 1. The example rear granular flux delivery device 112 includes a hopper 702 and an adjustable cover 710. As described in more detail below, the rear granular flux delivery device 112 takes granular flux as input and is configurable to output the granular flux to a strip cladding process at different rates. The example rear granular flux delivery device 112 can be configured to regulate the granular flux input rate to the hopper 702, the granular flux output rate from the hopper 702, and/or a dispersion are of the granular flux output from the hopper 702.

The example hopper 702 has an intake opening 704, a chute 706, and an output opening 708. The intake opening 704 receives the granular welding flux (e.g., from the granular welding flux supply 130). The output opening 708 outputs the granular welding flux from the chute 706 to an electroslag strip cladding process, a submerged arc welding process, or a submerged arc strip cladding process.

Figure 8:
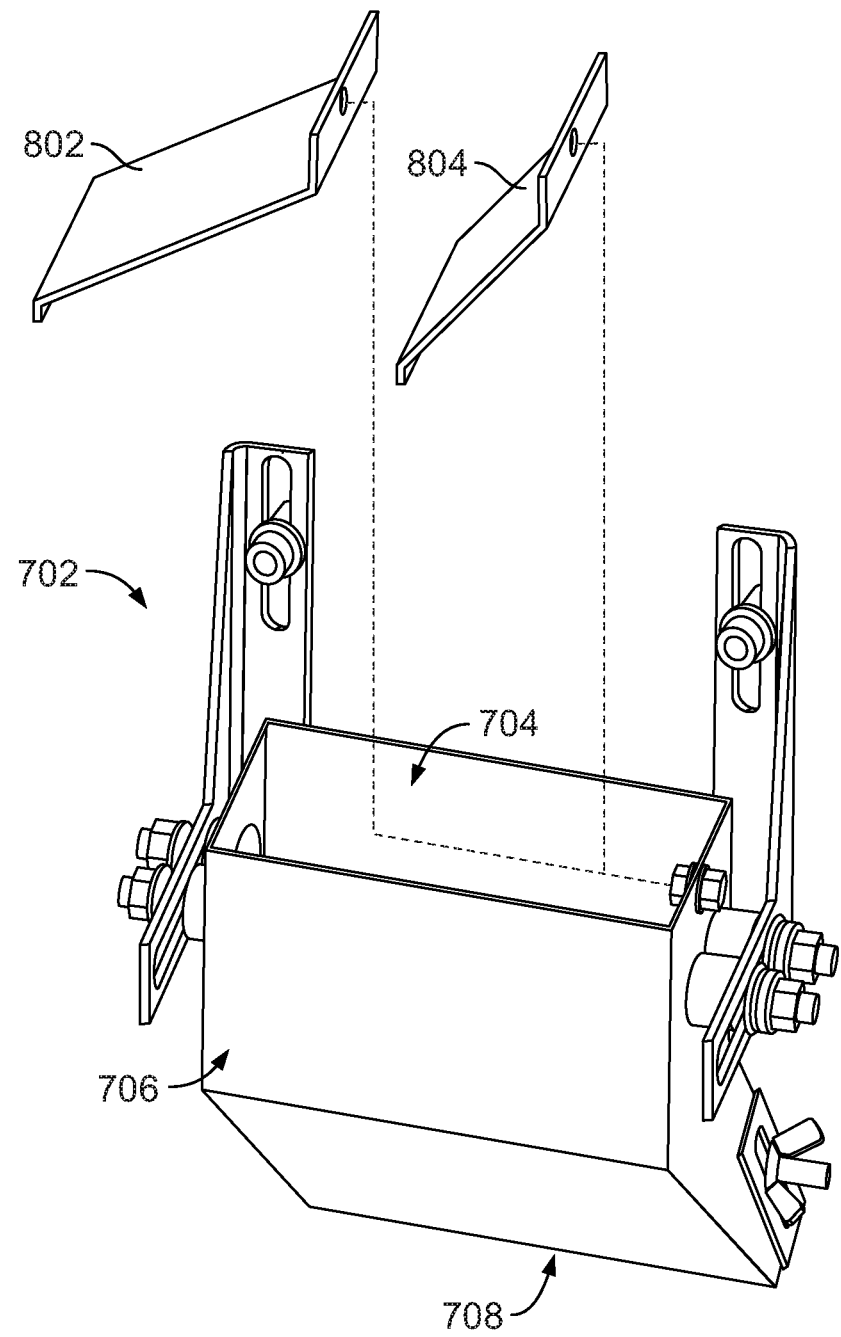
FIG. 8 illustrates the rear granular flux delivery device of FIG. 7 including an example implementation of the chute divider, in accordance with aspects of this disclosure.

The example rear granular flux delivery device 112 further includes a chute divider positioned within the chute 706 to reduce an intake rate of granular flux through the intake opening 704. FIG. 8 illustrates the rear granular flux delivery device 112 of FIG. 7 including an example implementation of the chute divider 802. The example chute divider 802 is a detachable rigid strip that is attached to the chute 706 (e.g., near the intake opening 704). The dimensions of the rigid strip determine the extent to which the chute divider 802 blocks or reduces the cross-section of the chute 706. For example, a first chute divider 802 has first dimensions (e.g., angle, length, etc.) to block a larger portion of the cross-section of the chute 706 and a second chute divider 804 has second dimensions (e.g., angle, length, etc.) to block a smaller portion of the cross-section of the chute 706. Thus, the second chute divider 804 may be installed to reduce a granular flux deposition rate from a maximum flow rate of the hopper 702, and the first chute divider 802 may be installed to further reduce the granular flux deposition rate. The chute dividers 802, 804 are interchangeable (e.g., replaceable).

Returning to FIG. 7, the example rear granular flux delivery device 112 also includes an adjustable output cover 710 attached to the chute 706 proximate to the output opening 708. The adjustable output cover 710 may extend and/or retract a length of the chute 706 by adjusting a location of the output opening 708 along the chute 706. The adjustable output cover 710 includes slots 712 that slide along tightening screws 714. The tightening screws 714 can be loosened to permit the adjustable output cover 710 to slide (e.g., extend and/or retract) by sliding the slots 712 along the tightening screws 714. When a desired position of the adjustable output cover 710 is reached, the tightening screws 714 may be tightened to fix the adjustable output cover 710 in the position.

In the example of FIG. 7, the chute 706 tapers toward the output opening 708. Thus, by moving the adjustable output cover 710 toward the intake opening 704, the output opening 708 has a larger cross-section (e.g., higher deposition rate, lower resistance to granular flux flow at the output opening 708). Additionally, having a larger cross-section at the output opening 708 may increase a deposition area of the granular flux at the workpiece 102. Conversely, moving the adjustable output cover 710 away from the intake opening 704 results in the output opening 708 having a smaller cross-section (e.g., lower deposition rate, higher resistance to granular flux flow at the output opening 708) and/or a smaller deposition area of the granular flux at the workpiece 102.

Figure 9A:
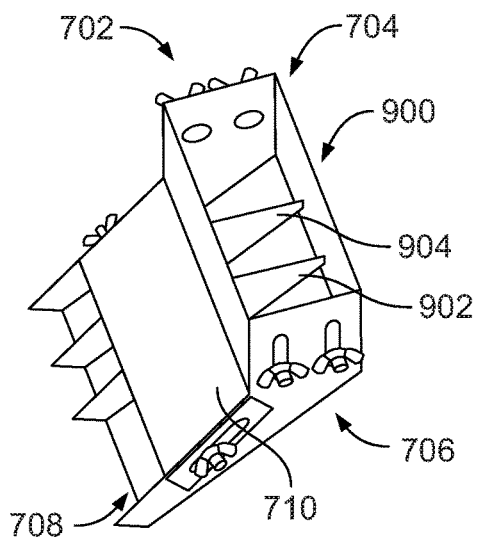
FIGS. 9A, 9B, and 9C illustrates the rear granular flux delivery device of FIG. 7 including another example implementation of a chute divider, in accordance with aspects of this disclosure.
Figure 9B:
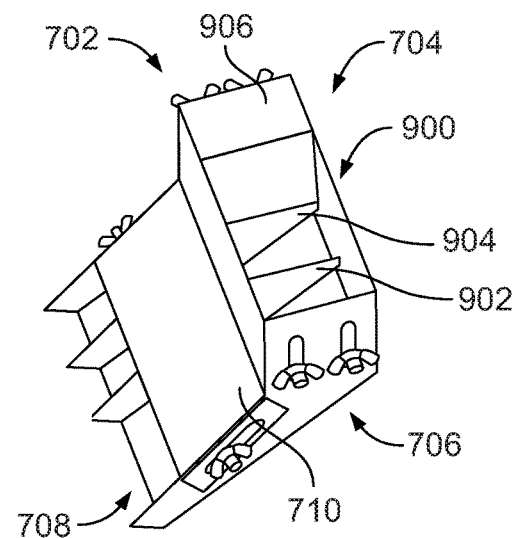
Figure 9C:
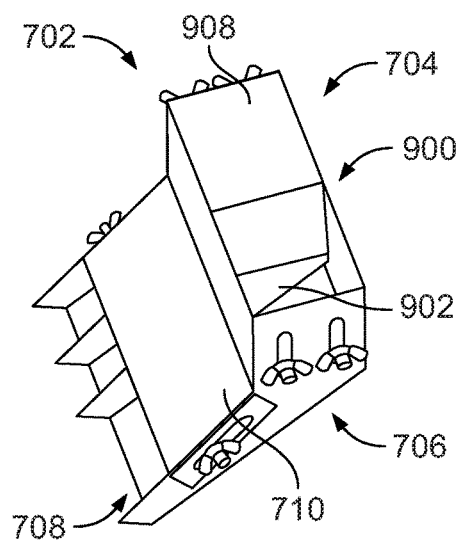

FIGS. 9A, 9B, and 9C illustrates the rear granular flux delivery device 112 of FIG. 7 including another example implementation of a chute divider. The example chute divider 900 of FIG. 9A includes one or more baffles 902, 904 extending longitudinally through the chute 706. The example baffles 902, 904 divide the chute 706 into three different portions (e.g., the baffles sub-divide the cross section of the chute 706). In some other examples, a single baffle divides the chute 706 into first and second portions. In other examples, additional baffles divide the chute 706 into additional portions. The example chute divider 900 further includes a removable insert 906, 908. A first removable insert 906 is shown installed (e.g., inserted) in FIG. 9B, and a second removable insert 908 is shown inserted in FIG. 9C. When installed in the intake opening 704, the inserts 906, 908 block portion(s) of the chute 706 and corresponding portion(s) of the intake opening 704. For example, the removable insert 906 blocks one of the three portions of the chute 706 and the intake opening 704, resulting in a lower granular flux delivery rate than if the entire hopper 702 is used. The removable insert 908 blocks two of the three portions of the chute 706 and the intake opening 704, resulting in a lower granular flux delivery rate than if the first removable inserter 906 is used.

As illustrated in FIGS. 9A-9C, the portions of the chute 706 may have different cross-sections. For example, when one of the portions of the chute 706 is used as shown in FIG. 9C, the portion of the chute 706 has a cross-section greater than ⅓ of the cross-section of the chute 706. Using the example strip electrode sizes of 30 mm, 60 mm, and 90 mm, the width of the single portion of the chute 706 (e.g., when the insert 908 is installed) is more than 30 mm to permit deposition of the granular flux on the sides of the 30 mm strip path at the workpiece 102. Use of the second portion of the chute 706 (in addition to the first portion) (e.g., when the insert 906 is installed) increases the width of the output opening 708 by, for example 30 mm to permit deposition of the granular flux on the sides of the 60 mm strip path at the workpiece 102. Similarly, use of the full cross-section of the chute 706 (e.g., the inserts 906, 908 are removed) further increases the width of the output opening 708 by, for example, 60 mm more than the width of the first portion to permit deposition of the granular flux on the sides of the 90 mm strip path at the workpiece 102.

FIGS. 9A-9C also illustrate an example of the adjustable output cover 710 in a position closer to the intake opening 704. As mentioned above, positioning the adjustable output cover 710 closer to the intake opening 704 (e.g., compared to the position illustrated in FIG. 7) increases the cross-section of the output opening 708 and permits a higher deposition rate of the granular flux through the output opening 708 and/or a larger deposition area of the granular flux at the workpiece 102.

Figure 10:
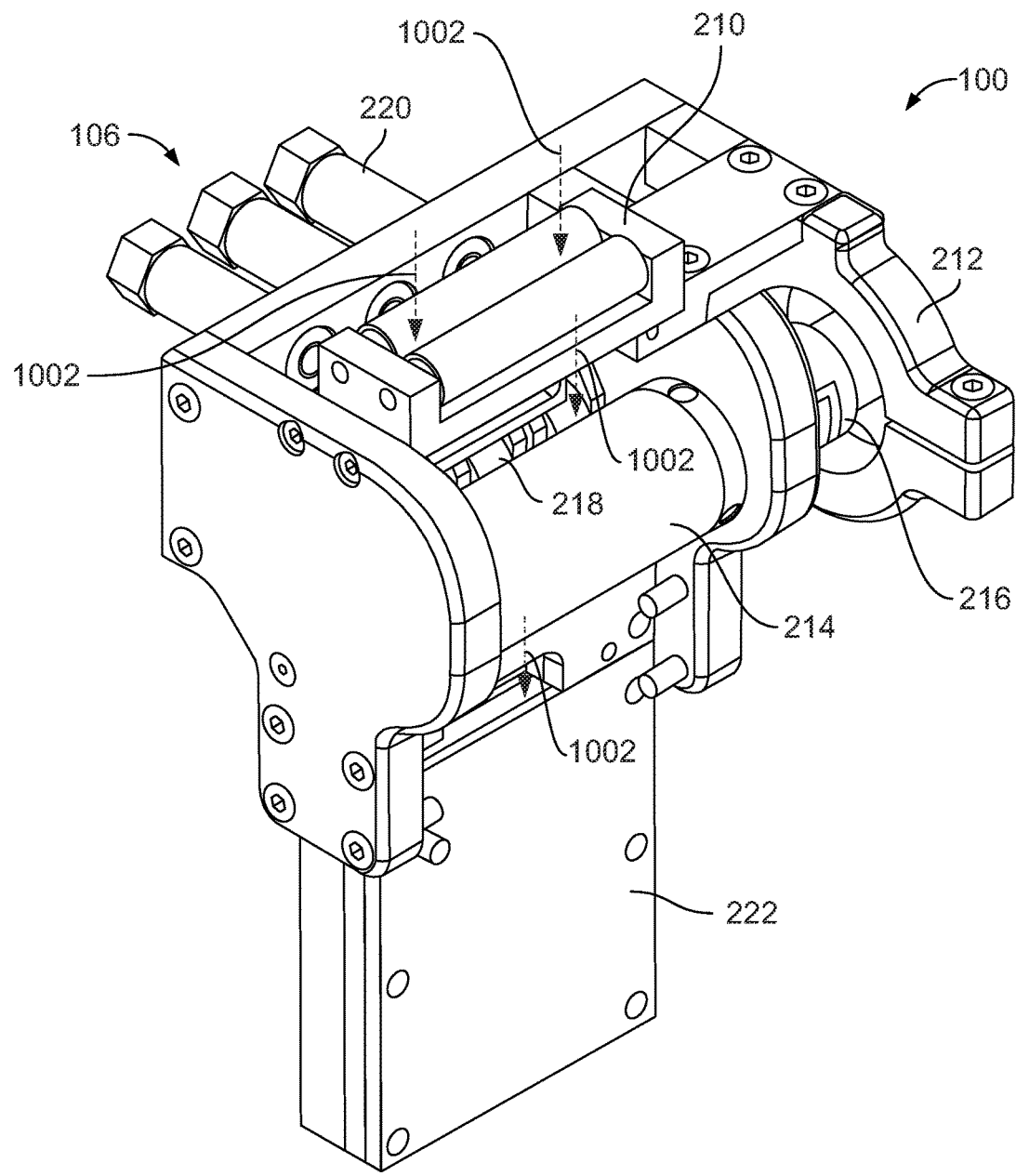
FIG. 10 illustrates an example implementation of the strip feeder of FIG. 1, in accordance with aspects of this disclosure.

FIG. 10 illustrates an example implementation of the strip feeder 106 of FIGS. 1 and 2. The example strip feeder 106 illustrated in FIG. 10 includes the upper strip guide 210, the feeder support 212, the drive roller 214, the drive roller clutch 216, the pressure rollers 218, the pressure adjusters 220, and the lower strip guide 222.

The drive roller 214 advances cladding strip(s) along a strip feed path 1002 to the cladding head 104 (e.g., through the contact plates 316-326 of the cladding head 104 of FIG. 1). The pressure rollers 218 and the pressure adjusters 220 press the cladding strip(s) traveling along the strip feed path 1002 against the drive roller 214, thereby enhancing the grip of the drive roller 214 on the cladding strip(s) and reducing or eliminating slippage between the drive roller 214 and the cladding strips. In the example of FIG. 10, the drive roller 214 is a hardened and knurled drive roller. However, other surface patterns and/or materials may be used.

The example pressure rollers 218 are positioned along the strip feed path 1002 opposite different sections of the drive roller (e.g., laterally across the strip feed path 1002). Different numbers of the pressure rollers 218 may be engaged based on a width of the cladding strip. For example, one of the pressure rollers 218 may be used for strip electrodes having a minimum strip width and all of the pressure rollers 218 may be used for strip electrodes having a maximum strip width.

The pressure adjusters 220 set pressures that are applied to the cladding strips by the corresponding ones of the pressure rollers 218. For example, a first one of the pressure adjusters 220 sets a first pressure applied to the cladding strip by a first one of the pressure rollers 218 and the first lateral section of the drive roller 214, a second one of the pressure adjusters 220 sets a second pressure applied to the cladding strip by a second one of the pressure rollers 218 and a second lateral section of the drive roller 214, and a third one of the pressure adjusters 220 sets a third pressure applied to the cladding strip by a third one of the pressure rollers 218 and a third lateral section of the drive roller 214. The pressure adjusters 220 are adjustable to disengage one or more of the pressure rollers 218 when the cladding strip has a width that does not require use of the corresponding pressure rollers 218.

Figure 11B:
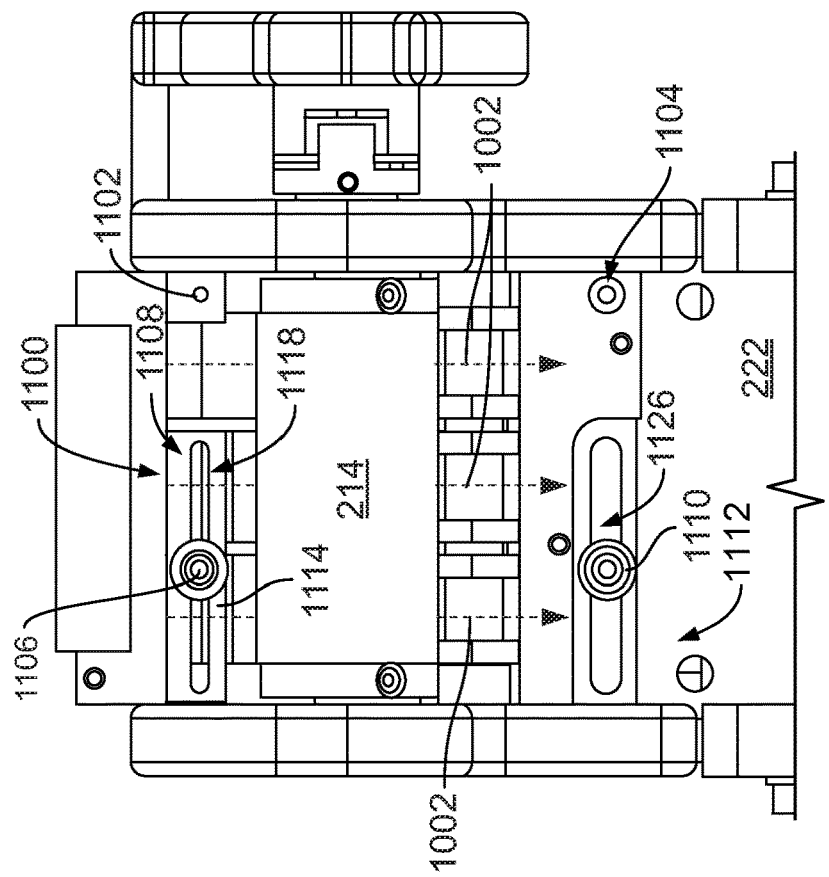
Figure 11A:
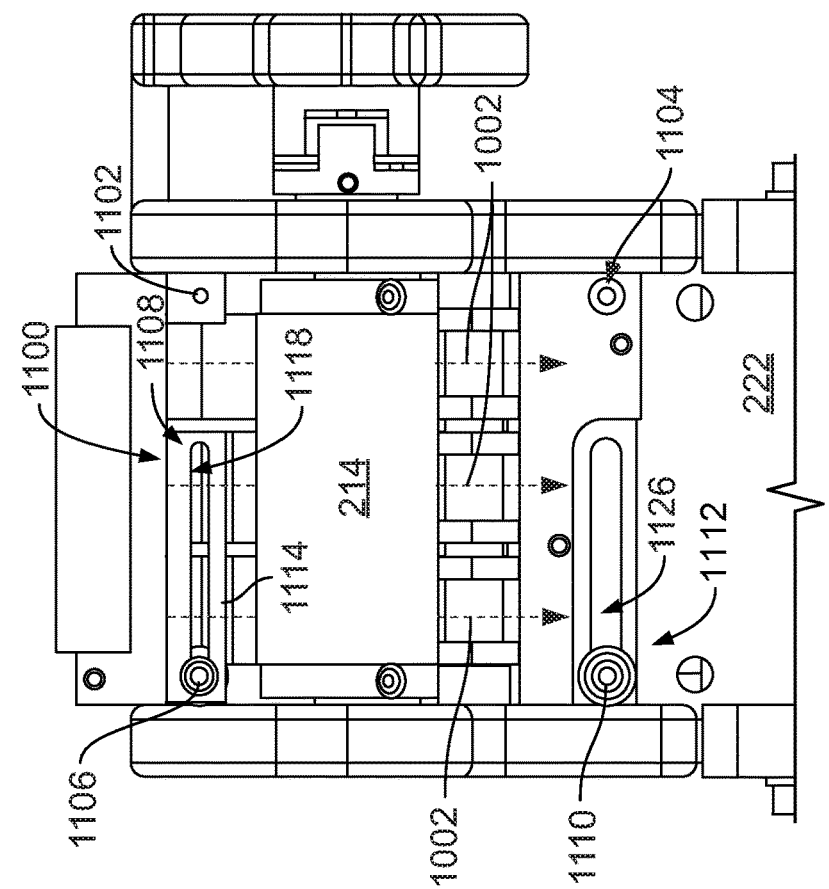
Figure 12:
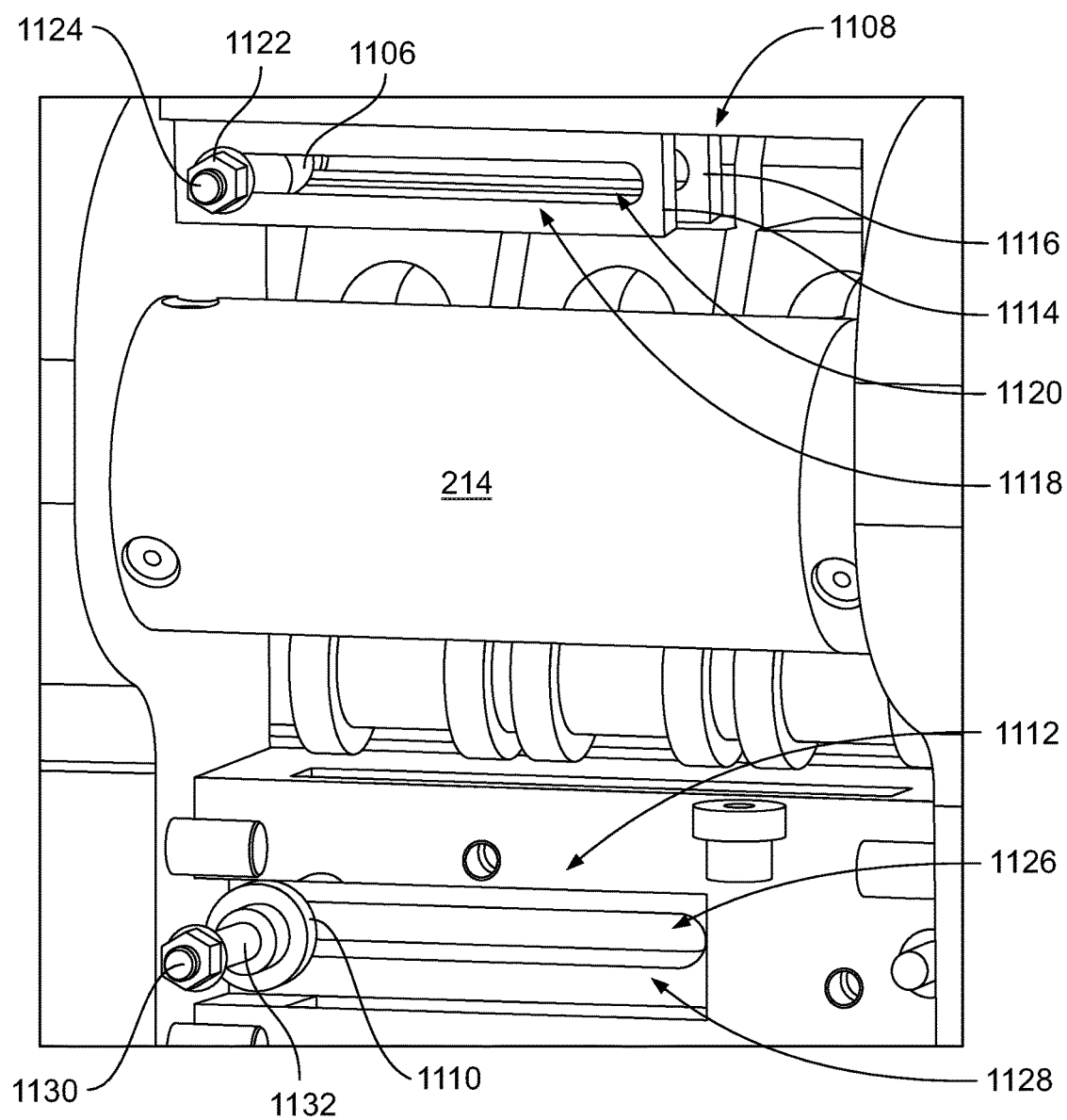
FIG. 12 illustrates another example view of the adjustable strip guide of FIGS. 11A, 11B, and 11C including the drive roller, in accordance with aspects of this disclosure.

FIGS. 11A, 11B, and 11C illustrate an example implementation of an adjustable strip guide 1100 for the strip feeder 106 of FIGS. 1 and 10. In the examples of FIGS. 11A, 11B, and 11C, the adjustable strip guide 1100 is reconfigurable to guide cladding strips of different widths without deconstruction and/or rebuilding of the strip feeder 106. The example adjustable strip guide 1100 guides cladding strip(s) along the strip feed path 1002 (e.g., between the drive roller 214 and the pressure roller(s) 218. FIG. 12 illustrates another example view of the adjustable strip guide 1100 of FIGS. 11A, 11B, and 11C including the drive roller 214.

As the drive roller 214 advances a cladding strip along the strip feed path 1002 to the cladding head 104 (e.g., through the contact plates 316-328), a first bearing 1102 and a second bearing 1104 located along the strip feed path 1002 laterally guide the cladding strip (e.g., prevent deviation or movement of the cladding strip in a direction lateral to the strip feed path 1002). The first and second bearings 1102, 1104 are aligned in a direction of the strip feed path 1002 and are located at different positions along the strip feed path 1002. For example, the first bearing 1102 is located prior to the drive roller 214 in the direction of travel of the electrode strips along the strip feed path 1002 and the second bearing is located after the drive roller 214 in the direction of travel of the electrode strips along the strip feed path 1002. In the example of FIGS. 11A-11C, the first and second bearings 1102, 1104 have fixed lateral positions.

The example adjustable strip guide 1100 includes an adjustable bearing 1106 to guide the cladding strip. A strip width adjuster 1108 permits adjustment of the position of the adjustable bearing 1106 across the strip feed path 1002 to accommodate strips of different widths and/or to secure the adjustable bearing 1106 against movement across the strip feed path 1002. The strip width adjuster 1108 permits adjustment of the position of the adjustable bearing 1106 to accommodate strip widths up to an upper strip width limit of the drive roller 214 and/or to a lower strip width limit of the drive roller 214.

The example adjustable strip guide 1100 also includes a second adjustable bearing 1110 and a second strip width adjuster 1112. The second strip width adjuster 1112 is similar to the strip width adjuster 1108, but is located after the drive roller 214 in the direction of travel of the electrode strips along the strip feed path 1002.

As illustrated in FIGS. 11A-11C and 12, the example strip width adjuster 1108 includes guide rails 1114, 1116 that have slots 1118, 1120 extending across at least part of the strip feed path 1002. The strip width adjuster 1108 also includes a fastener 1122 to fix the position of the adjustable bearing 1106 along the slot 1118, 1120. In the example of FIGS. 11A-11C and 12, the guide rails 1114, 1116 are positioned on opposite sides of the adjustable bearing 1106 such that the strip feed path 1002 extends between the guide rails 1114, 1116. The bearing 1106 is supported on a bolt 1124 extending through the slots 1118, 1120, and the fastener 1122 includes a nut or other tightening mechanism that may be tightened to secure the bolt 1124 and the adjustable bearing 1106 at one location along the slots 1118, 1120.

Similarly, the example strip width adjuster 1112 includes slots 1126, 1128, a fastener 1130, a bolt 1132. In the example of FIGS. 11A-11C and 12, the slots 1126, 1128 are part of static cladding head clamping plate 204 and the lower strip guide 222 of FIG. 2, instead of having dedicated guide rails. However, the strip width adjuster 1112 may be implemented using guide rails as with the strip width adjuster 1108.

The bolt 1132 supports the adjustable bearing 1110 and may be positioned along the slots 1126, 1128. The fastener 1130 is tightened to secure the bolt 1132 and the adjustable bearing 1110 at one position along the slots 1126, 1128.

In some examples, the slots 1118, 1120 and/or the slots 1126, 1128 may include one or more grooves along the slots 1118, 1120 to reduce lateral movement of the adjustable bearing 1106 when the bolt 1124 is adjusted into the groove and the fastener 1122 is tightened. Additionally or alternatively, the slots 1118, 1120 are aligned with the slots 1126, 1128 to align the adjustable bearings 1106, 1110 in the direction of travel of the strip electrode along the strip feed path 1002, and the grooves improve the alignment of the adjustable bearing 1106 with the adjustable bearing 1110.

In the example of FIGS. 11A-11C and 12, the bearings 1102 and 1104 are aligned in the direction of travel of the strip electrode along the strip feed path 1002, the adjustable bearings 1106 and 1110 are aligned in the direction of travel of the strip electrode along the strip feed path 1002, the bearing 1102 and the adjustable bearing 1106 are aligned across the strip feed path 1002, and the bearing 1104 and the adjustable bearing 1110 are aligned across the strip feed path 1002. However, in other examples, one or more of the bearings 1102, 1104, 1106, and 1110 may be staggered (e.g., placed at different locations) in the direction of travel of the strip electrode along the strip feed path 1002. Additionally or alternatively, while the bearings 1102, 1104 have a static position on one side of the strip feed path 1002 and the adjustable bearings 1106, 1110 can be adjusted on the other side of the strip feed path 1002 to change the width of the strip feed path 1002, in other examples the bearings 1102, 1104 are at fixed positions on the opposite side of the strip feed path 1002 from the illustrated example and the adjustable bearings 1106, 1110 are on opposite side of the strip feed path 1002 from the illustrated example.

In still other examples, such as the example configuration illustrated in FIG. 11D, any or all of the bearings 1102, 1104, 1106, 1110 are adjustable bearings that can be positioned at different locations across the strip feed path 1002 to select different alignments of the strip electrodes in the strip feed path 1002 (e.g., aligned on the left side of the strip feed path 1002, aligned on the right side of the strip feed path 1002, and/or aligned between the two sides of the strip feed path 1002). Using adjustable bearings for all of the bearings 1102, 1104, 1106, 1110 also enables use of a desired portion of the drive roller 214 and/or changing of the ones of the contact jaws 310-314 that are used to provide the welding power to the strip electrodes.

In the example of FIG. 11D, the guide rails 1114, 1116 and the slots 1118, 1120, and/or the slots 1126, 1128, extend across the entirety of the strip feed path 1002. The bearings 1102 and 1106 are both adjustable within the slots 1118, 1120 via corresponding bolts and fasteners. Similarly, the bearings 1104 and 1110 are adjustable within the slots 1126, 1128 via corresponding bolts and fasteners.

In contrast to conventional cladding systems, the strip width adjuster 1108 permits use of different strip widths adjustment of the position of the adjustable bearing 1106 without deconstruction of the strip feeder 106 or the cladding head 104. Instead, the example strip width adjusters 1108, 1112 enable movement of the adjustable bearings 1106, 1110 via loosening of the fixing mechanism (e.g., the fasteners 1122, 1130), sliding of the bolts 1124, 1132 along the slots 1118, 1120, 1126, 1128, and tightening of the fixing mechanism (e.g., the fasteners 1122, 1130).

Figure 13:
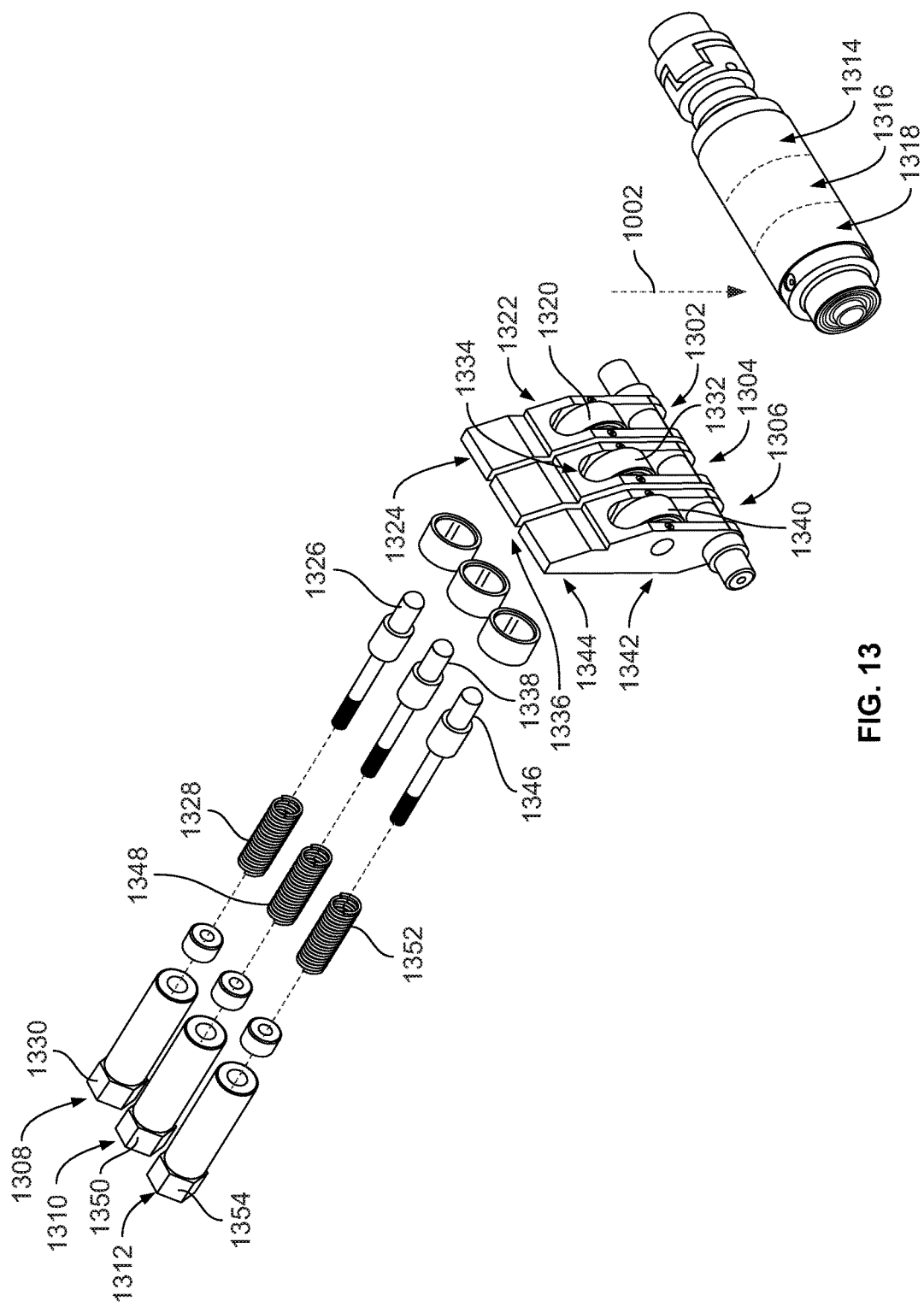
FIG. 13 illustrates an example implementation of adjustable pressure roller assemblies for the strip feeder of FIGS. 1 and 10, in accordance with aspects of this disclosure.
Figure 14:
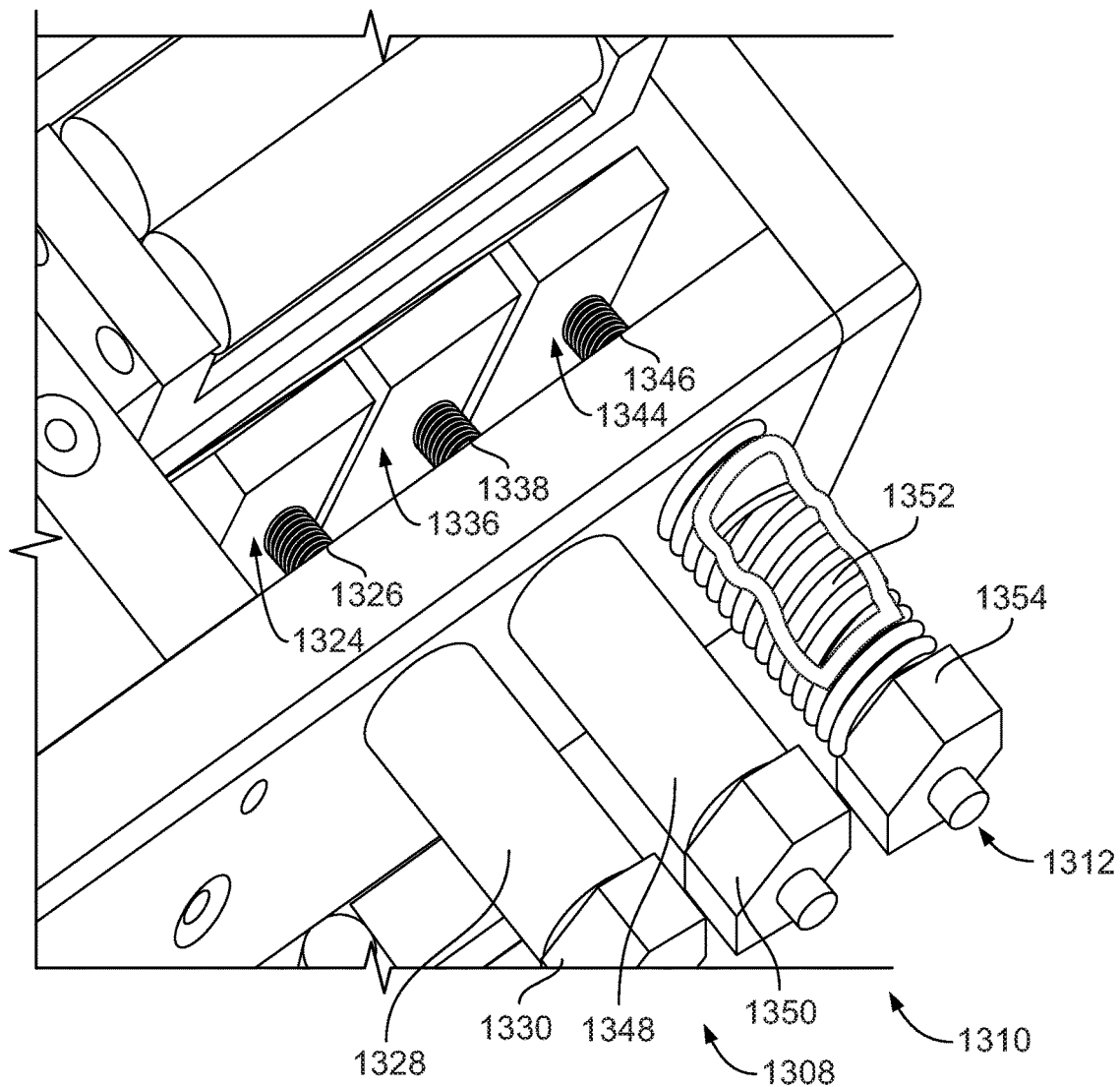
FIG. 14 illustrates another view of the example adjustable pressure roller assemblies of FIG. 13, including the drive roller, the adjustable pressure roller assemblies, and the pressure adjusters, in accordance with aspects of this disclosure.

FIG. 13 illustrates an example implementation of adjustable pressure roller assemblies 1302, 1304, 1306 for the strip feeder 106 of FIGS. 1 and 10. In the example of FIG. 13, the pressures applied by the adjustable pressure roller assemblies 1302, 1304, 1306 are individually and independently adjustable via respective pressure adjusters 1308, 1310, 1312. The example adjustable pressure roller assemblies 1302, 1304, 1306 and the example pressure adjusters 220 are illustrated in FIG. 13 in a partially exploded view. FIG. 14 illustrates another view of the example adjustable pressure roller assemblies 1302, 1304, 1306 of FIG. 13, including the drive roller 214, the adjustable pressure roller assemblies 1302, 1304, 1306, and the pressure adjusters 1308, 1310, 1312.

The pressure roller assemblies 1302, 1304, 1306 are positioned along the strip feed path 1002 of FIG. 10. The first pressure roller assembly 1302 is positioned along the strip feed path 1002 opposite a first section 1314 of the drive roller 214, the second pressure roller assembly 1304 is positioned along the strip feed path 1002 opposite a second section 1316 of the drive roller 214, and the third pressure roller assembly 1304 is positioned along the strip feed path 1002 opposite a third section 1318 of the drive roller 214. The pressure roller assemblies 1302, 1304, 1306 are capable of applying substantially even pressure against strip electrode(s) moving through the strip feed path 1002 and the drive roller 214.

The pressure roller assembly 1302 includes a pressure roller 1320, which is coupled to a roller housing 1322. The roller housing 1322 is rotatably coupled to the example feeder support 212 that also supports the drive roller 214. The roller housing 1322 is permitted to rotate to engage and/or disengage the pressure applied by the pressure roller 1320 to the strip electrode and the drive roller 214. The pressure roller 1320 is permitted to rotate within the roller housing 1322 (e.g., as the strip electrode traverses the strip feed path 1002 in contact between the pressure roller 1320 and the drive roller 214.

The pressure adjuster 1308 applies pressure to a surface 1324 of the roller housing 1322, which pushes the pressure roller 1320 toward the drive roller 214 and applies a corresponding pressure to the strip electrode traveling through the strip feed path 1002. The pressure adjuster 1308 includes a finger 1326 to contact the first roller housing 1322, a spring 1328 to bias the finger 1326 toward the first roller housing 1322, and a spring compressor 1330 to apply a compressive force to the spring 1328 to set the bias of the finger 1326 toward the roller housing 1322. The example pressure adjuster 1308 is attached to the feeder support 212, which also supports the pressure roller assemblies 1302-1306. In the example of FIGS. 13 and 14, the spring compressor 1330 is a knob or nut that may be screwed to increase the compressive force between the spring compressor 1330 and the finger 1326.

The pressure roller assemblies 1304, 1306 are similar or identical to the pressure roller assembly 1302. Similarly, the pressure adjusters 1310, 1312 are similar or identical to the pressure adjuster 1308, and apply respective pressures to the pressure roller assemblies 1304, 1306. The pressure roller assembly 1304 includes a pressure roller 1332, a roller housing 1334, and a surface 1336 that is contacted by a finger 1338 of the pressure adjuster 1310 to set the pressure applied by the pressure roller 1332. The pressure roller assembly 1306 includes a pressure roller 1340, a roller housing 1342, and a surface 1344 that is contacted by a finger 1346 of the pressure adjuster 1312 to set the pressure applied by the pressure roller 1340. The pressure adjuster 1310 includes a spring 1348 to bias the finger 1338 toward the pressure roller assembly 1304 and a spring compressor 1350 to set the pressure applied by the finger 1338 via the spring 1348. The example pressure adjuster 1312 includes a spring 1352 to bias the finger 1346 toward the pressure roller assembly 1306 and a spring compressor 1354 to set the pressure applied by the finger 1346 via the spring 1352. The pressures applied by the pressure adjusters 1308, 1310, 1312 are independently adjustable. That is, the pressure set via the pressure adjuster 1308 can be different that the pressure set via either of the pressure adjusters 1310, 1312.

Additionally or alternatively, the pressure adjusters 1308-1312 are adjustable to disengage the pressure roller assemblies 1302-1306 from the drive roller 214 when the cladding strip has a width that uses fewer than all of the sections 1314-1318 of the drive roller 214. For example, if the strip electrode width corresponds to the section 1314 of the drive roller 214, the pressure adjusters 1310, 1312 may disengage the pressure rollers 1332, 1340 from the sections 1316, 1318 of the drive roller 214.

In some examples, the strip feeder 106 supports strip electrodes having one of multiple incremental strip widths (e.g., using a 30 mm incremental width such as 30 mm strips, 60 mm strips, 90 mm strips, 120 mm strips, 150 mm strips, etc., and/or another incremental strip width). For strip electrodes having one of the multiple incremental strip widths, the pressure rollers 1320, 1332, 1340 apply symmetric pressure across a width of the cladding strip by selectively setting the pressure adjusters to apply the respective pressures based on the incremental strip width of the strip electrode being used. The symmetric pressure applied by the pressure rollers 1320, 1332, 1340 (and/or a subset of the pressure rollers 1320, 1332, 1340 based on the strip width) provides a balanced feeding force to reduce or prevent misalignment of the strip electrode at the cladding head. For example, if a 30 mm strip width is used, the pressure roller 1320 applies a symmetric pressure to the strip (e.g., to the center of the strip width) and the pressure rollers 1332, 1340 are disengaged. If a 60 mm strip width is used, the pressure rollers 1320, 1332 apply a symmetric pressure to the strip (e.g., at equal distances from the center of the strip width) and the pressure roller 1340 is disengaged. If a 90 mm strip width is used, the pressure rollers 1320, 1332, 1340 apply a symmetric pressure to the strip (e.g., at equal distances from the center of the strip width and at the center of the strip width). If the strip feeder 106 includes four pressure rollers and corresponding pressure adjusters to support a 120 mm strip width, all four pressure rollers apply a symmetric pressure to the strip (e.g., at equal pairs of distances from the center of the strip width). Additional strip widths may be supported by adding further pressure rollers and pressure adjusters.

While an example implementation of the pressure adjusters 1308, 1310, 1312 are illustrated in FIGS. 13 and 14, other implementations and/or configurations may be used. For example, the springs 1328, 1348, 1352 may be replaced by other biasing elements. Other shapes and/or sizes of the fingers 1326, 1338, 1346 may be used, and/or the fingers 1326, 1338, 1346 may be omitted in favor of direct contact between the springs 1328, 1348, 1352 (or other biasing element(s)) and the pressure roller assemblies 1302-1306. The spring compressors 1330, 1350, 1354 may be replaced with different components to increase, decrease, and/or relieve the pressure applied to the pressure rollers 1320, 1332, 1340. The spring compressors 1330, 1350, 1354 may increase or decrease the compression on the springs 1328, 1348, or 1352 by, for example, moving the position of the knob, screw, or nut relative to a fixed location (e.g., relative to the feeder support 212) and/or by extending and/or retracting the fingers 1326, 1338, 1346 relative to a location at which the springs 1328, 1348, 1352 apply pressure. The example pressure adjusters 1308, 1310, 1312 may have visible pressure scales (e.g., graded scales) such that an operator of the cladding head can see the pressure level being applied on each of the pressure adjusters. The example visible scales enable an operator to apply a same level of pressure for each pressure roller being used (which may not be all of the available pressure rollers, based on the width of the strip electrode).

Example pressure roller assemblies 1302-1306 are illustrated in FIGS. 13 and 14. However, other implementations and/or configurations may be used. For example, while the roller housings 1322, 1334, 1342 are used in the illustrated example to support the pressure rollers 1320, 1332, 1340 and/or provide leverage for the pressure applied by the pressure adjusters 1308, 1310, 1312, other configurations of the roller housings 1322, 1334, 1342 may be used, and/or the pressure rollers 1320, 1332, 1340 may be integrated into the pressure adjusters 1308-1312 such that the pressure adjusters 1308-1312 include a structure to support the pressure rollers 1320, 1332, 1340.

Figure 15:
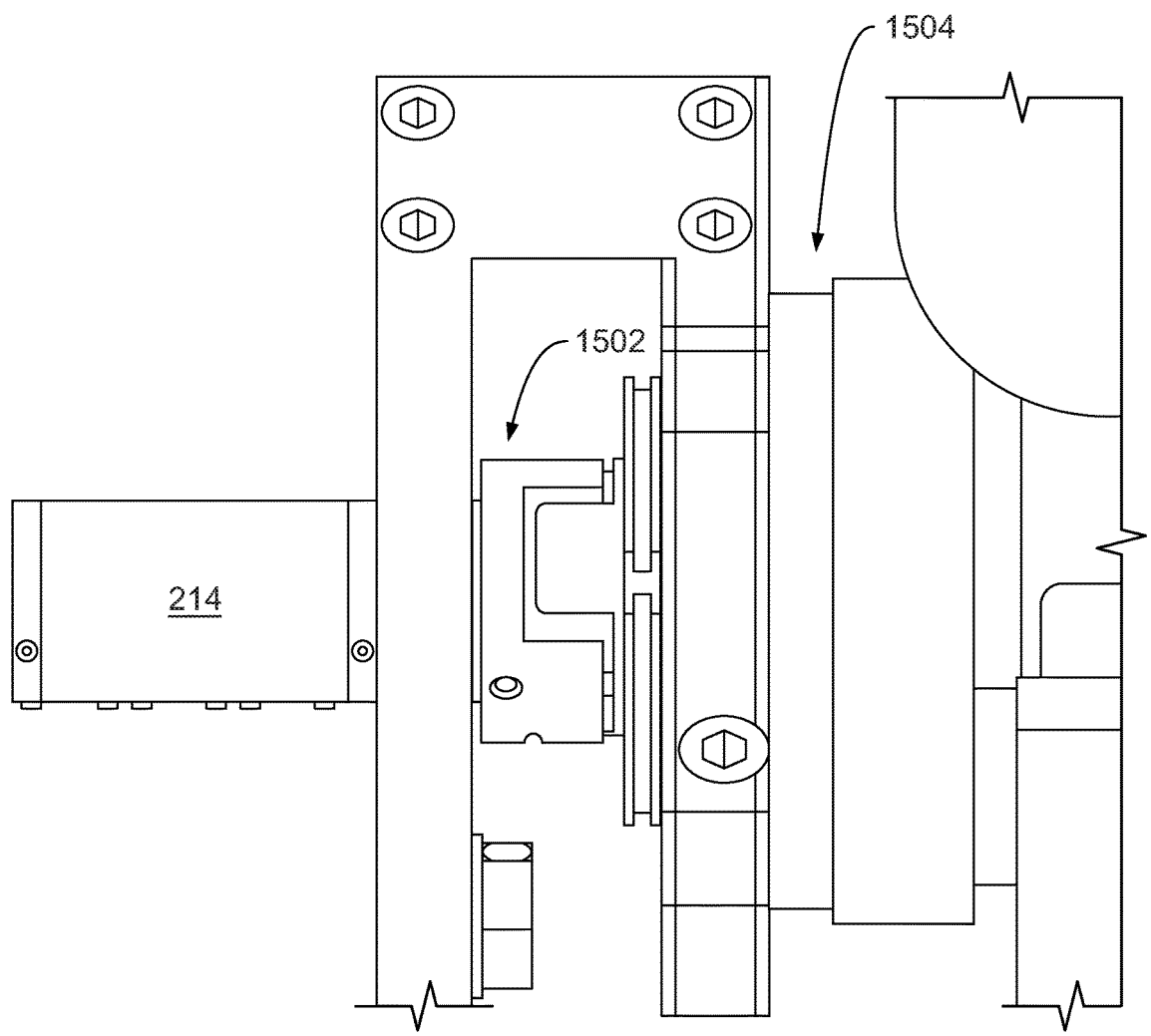
FIG. 15 illustrates an example implementation of the strip feeder of FIGS. 1 and 10, in which the drive roller is equipped with a clutch adapter for connection to a drive shaft, in accordance with aspects of this disclosure.
Figure 16:
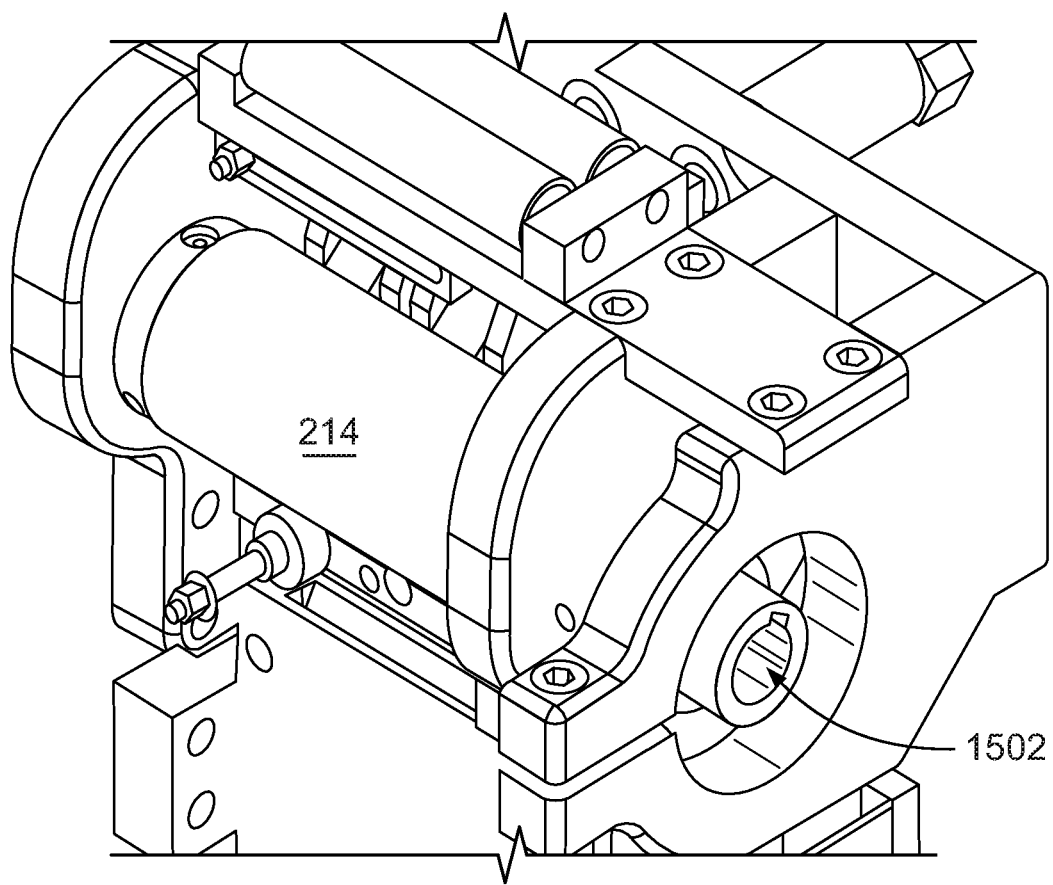
FIG. 16 illustrates another view of the example drive roller and the example clutch adapter of FIG. 15, in accordance with aspects of this disclosure.

FIG. 15 illustrates an example implementation of the strip feeder 106 of FIGS. 1 and 10, in which the drive roller 214 is equipped with a clutch adapter 1502 for connection to a drive shaft 1504. FIG. 16 illustrates another view of the example drive roller and the example clutch adapter of FIG. 15. The example clutch adapter 1502 may be any type of detachable clutch configured to connect an interface of the drive roller 214 to an interface of the drive shaft 1504. The example drive shaft 1504 is driven by a power source (e.g., the welding power source 108 of FIG. 1, such as an engine driven power source and/or a power supply that converts primary power to, among other things, rotational power to drive the drive roller 214).

Use of the clutch adapter 1502 of FIG. 15 reduces stress on the drive shaft 1504 by removing the drive roller 214 as a vertical load on the drive shaft 1504. As used herein, the term "vertical" refers to a direction parallel to the gravitational pull of the earth. Instead, the weight of the drive roller 214 is supported via the feeder support 212, and the clutch adapter 1502 couples the drive roller 214 to the drive shaft 1504 such that the drive shaft 1504 does not support a substantial amount of the weight of the drive roller 214. The example clutch adapter 1502 reduces or eliminates line-up variances between the drive roller 214 and the drive shaft 1504, thereby reducing motor axle fatigue and/or bearing wear due to out of line loads.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A cladding head for a strip cladding system, comprising:
    a first contact jaw comprising first and second contacts to deliver welding power to a first cladding strip that is driven between the first and second contacts;
    a first finger coupled to the first contact on a first end of the first finger, and coupled to a pivot;
    a first spring coupled to a second end of the first finger opposite the first end and configured to bias the second end of the finger toward a support structure to bias the first contact toward the second contact via the pivot;
    a first contact pressure adjuster, positioned on an opposite side of the support structure from the second end of the finger, and configured to set a first pressure applied by the first and second contacts to the first cladding strip via the spring when the first cladding strip has any of at least three incremental strip widths;
    a second contact jaw comprising third and fourth contacts configured to deliver the welding power to a second cladding strip that is driven between the third and fourth contacts;
    a second contact pressure adjuster configured to set a second pressure applied by the third and fourth contacts to the second cladding strip when the second cladding strip has a first one of the at least three incremental widths or a second one of the at least three incremental widths;
    a third contact jaw comprising fifth and sixth contacts configured to deliver the welding power to the cladding strip that is driven between the fifth and sixth contacts;
    a third contact pressure adjuster configured to set a third pressure applied by the fifth and sixth contacts to a third cladding strip when the third cladding strip has the first one of the at least three incremental widths,
    wherein the first, second, and third contact jaws are configured to selectively provide symmetrical contact with the cladding strip across a width of the third cladding strip, the three incremental strip widths corresponding to ones of the first, second, and third contact jaws.

2. The cladding head as defined in claim 1, wherein the second contact pressure adjuster is configured to enable disengagement of the second pressure when the first cladding strip has a third one of the at least three incremental widths, the third and fourth contacts to be out of electrical contact when the second pressure is disengaged via the second contact pressure adjuster.

3. The cladding head as defined in claim 1, wherein the third contact pressure adjuster is configured to enable disengagement of the third pressure when the first or second cladding strip has the second one of the at least three incremental widths or a third one of the at least three incremental widths, the fifth and sixth contacts to be out of electrical contact when the second pressure is disengaged via the second contact pressure adjuster.

4. The cladding head as defined in claim 1, wherein the at least three incremental widths comprise 30 millimeters, 60 millimeters, and 90 millimeters.

5. The cladding head as defined in claim 4, further comprising:
a fourth contact jaw comprising seventh and eighth contacts to deliver the welding power to a fourth cladding strip that is driven between the seventh and eighth contacts; and
a fourth contact pressure adjuster to set a fourth pressure applied by the seventh and eighth contacts to a fourth cladding strip when the fourth cladding strip has a width of 120 millimeters.

6. The cladding head as defined in claim 1, further comprising a strip guide to feed the first cladding strip through the first contact jaw such that the first cladding strip laterally extends from the first contact jaw by between 0 millimeters and 3 millimeters on a first lateral side and between 0 millimeters and 3 millimeters on a second lateral side.

7. The cladding head as defined in claim 1, wherein the first and second contacts are to apply the first pressure to a first section of the first cladding strip, the third and fourth contacts are to apply the second pressure to a second section of the first cladding strip, and the fifth and sixth contacts are to apply the third pressure to a third section of the first cladding strip.

8. The cladding head as defined in claim 1, wherein the first and second contacts are separated laterally from the third and fourth contacts by a gap of at least 1 millimeter.

9. The cladding head as defined in claim 1, wherein the first contact pressure adjuster is configured to set the first pressure independently of the pressure or disengagement of the second contact pressure adjuster or the third contact pressure adjuster.

10. A strip cladding system, comprising:
a power source configured to provide welding power; and
a cladding head configurable to deliver a first cladding strip to a workpiece using the welding power and configurable to deliver a second cladding strip to the workpiece, the first cladding strip having a first strip width of at least three incremental widths and the second cladding strip having a second width of the at least three incremental widths, the cladding head comprising:
a first contact jaw comprising first and second contacts configured to deliver the welding power to the first cladding strip or the second cladding strip that are driven between the first and second contacts;
a first finger coupled to the first contact on a first end of the first finger, and coupled to a pivot;
a first spring coupled to a second end of the first finger opposite the first end and configured to bias the second end of the finger toward a support structure to bias the first contact toward the second contact via the pivot;
a first contact pressure adjuster, positioned on an opposite side of the support structure from the second end of the finger, and configured to set a first pressure applied by the first and second contacts to the first cladding strip via the spring when the first cladding strip has any of at least three incremental strip widths;
a second contact jaw comprising third and fourth contacts configured to deliver the welding power to the first cladding strip or the second cladding strip that are driven between the third and fourth contacts;
a second contact pressure adjuster configured to set a second pressure applied by the third and fourth contacts to the second cladding strip when the second cladding strip has a first one of the at least three incremental widths or a second one of the at least three incremental widths;
a third contact jaw comprising fifth and sixth contacts configured to deliver the welding power to the first cladding strip or the second cladding strip that are driven between the fifth and sixth contacts;
a third contact pressure adjuster configured to set a third pressure applied by the fifth and sixth contacts to a third cladding strip when the third cladding strip has the first one of the at least three incremental widths,
wherein the first, second, and third contact jaws are configured to selectively provide symmetrical contact with the first cladding strip or the second cladding strip across a width of the first cladding strip or the second cladding strip.

11. The strip cladding system as defined in claim 10, wherein the second contact pressure adjuster is configured to enable disengagement of the second pressure when the first cladding strip has a third one of the at least three incremental widths, the third and fourth contacts to be out of electrical contact when the second pressure is disengaged via the second contact pressure adjuster.

12. The strip cladding system as defined in claim 10, wherein the third contact pressure adjuster is configured to enable disengagement of the third pressure when the first or second cladding strip has the second one of the at least three incremental widths or a third one of the at least three incremental widths, the fifth and sixth contacts to be out of electrical contact when the second pressure is disengaged via the second contact pressure adjuster.

13. The strip cladding system as defined in claim 10, wherein the at least three incremental widths comprise 30 millimeters, 60 millimeters, and 90 millimeters.

14. The strip cladding system as defined in claim 13, further comprising:
a fourth contact jaw comprising seventh and eighth contacts to deliver the welding power to a fourth cladding strip that is driven between the seventh and eighth contacts; and
a fourth contact pressure adjuster to set a fourth pressure applied by the seventh and eighth contacts to a fourth cladding strip when the fourth cladding strip has a width of 120 millimeters.

15. The strip cladding system as defined in claim 10, further comprising a strip guide to feed the first cladding strip through the first contact jaw such that the first cladding strip laterally extends from the first contact jaw by between 0 millimeters and 3 millimeters on a first lateral side and between 0 millimeters and 3 millimeters on a second lateral side.

16. The strip cladding system as defined in claim 10, wherein the first and second contacts are to apply the first pressure to a first section of the first cladding strip, the third and fourth contacts are to apply the second pressure to a second section of the first cladding strip, and the fifth and sixth contacts are to apply the third pressure to a third section of the first cladding strip.

17. The strip cladding system as defined in claim 10, wherein the first and second contacts are separated laterally from the third and fourth contacts by a gap of at least 1 millimeter.

18. The strip cladding system as defined in claim 10, wherein the first contact pressure adjuster is configured to set the first pressure independently of the pressure or disengagement of the second contact pressure adjuster or the third contact pressure adjuster.

* * * * *